(12) United States Patent
Roe et al.

(10) Patent No.: US 11,661,172 B2
(45) Date of Patent: May 30, 2023

(54) WING DESIGN FOR REMOVABLE BATTERY

(71) Applicant: Bell Textron Inc., Fort Worth, TX (US)

(72) Inventors: Robert W. Roe, Fort Worth, TX (US); Mark L. Isaac, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 199 days.

(21) Appl. No.: 17/139,049

(22) Filed: Dec. 31, 2020

(65) Prior Publication Data

US 2022/0204154 A1 Jun. 30, 2022

(51) Int. Cl.
*B64C 3/32* (2006.01)
*B64C 29/00* (2006.01)

(52) U.S. Cl.
CPC ............ *B64C 3/32* (2013.01); *B64C 29/0033* (2013.01)

(58) Field of Classification Search
CPC .............................. B64C 3/32; B64C 29/0033
See application file for complete search history.

(56) References Cited

U.S. PATENT DOCUMENTS

| | | | |
|---|---|---|---|
| 8,967,529 B1 * | 3/2015 | Bennett ................. | B64D 27/24 446/57 |
| 10,457,378 B2 | 10/2019 | Kooiman et al. | |
| 2004/0211862 A1 * | 10/2004 | Elam ..................... | B64D 27/24 244/58 |
| 2018/0312251 A1 * | 11/2018 | Petrov .................... | B64D 27/12 |
| 2019/0148689 A1 * | 5/2019 | Keum ................. | H01M 50/147 429/151 |
| 2019/0165408 A1 * | 5/2019 | Andryukov ......... | H01M 50/229 |
| 2020/0140103 A1 * | 5/2020 | Halverson .............. | B64C 3/185 |
| 2020/0269708 A1 | 8/2020 | Bernhardt et al. | |
| 2020/0277062 A1 * | 9/2020 | Becker .................. | B64D 31/02 |
| 2020/0391683 A1 | 12/2020 | Bernhardt | |
| 2020/0391843 A1 * | 12/2020 | Bernhardt ............. | B60L 50/66 |
| 2021/0339881 A1 * | 11/2021 | Bevirt .................... | B60L 58/18 |
| 2021/0391627 A1 * | 12/2021 | Villanueva .......... | B64C 29/0033 |

FOREIGN PATENT DOCUMENTS

| | | | | |
|---|---|---|---|---|
| EP | 3594105 A1 | | 1/2020 | |
| EP | 3733511 A1 | * | 11/2020 | ............. B60L 53/80 |
| KR | 10-2018-0041423 | | 4/2018 | |
| WO | WO 2020/077121 A1 | | 4/2020 | |

OTHER PUBLICATIONS

European Search Report dated May 3, 2022 for Application No. 21218402.2, 4 pages

* cited by examiner

*Primary Examiner* — Brady W Frazier
*Assistant Examiner* — Shanna Danielle Glover
(74) *Attorney, Agent, or Firm* — Frost Brown Todd LLP

(57) ABSTRACT

A wing for an aircraft includes a first end, a second end, and a skin extending longitudinally from the first end to the second end. The wing also includes at least one channel positioned within the skin and extending longitudinally between the first and second ends. The at least one channel defines a longitudinal translation path for translating at least one electrical power source longitudinally between the first and second ends.

20 Claims, 15 Drawing Sheets

WING DESIGN FOR REMOVABLE BATTERY

TECHNICAL FIELD

The present disclosure is directed to a wing design for an aircraft and, more particularly, to a wing design for removably storing a battery in the wing of the aircraft.

BACKGROUND OF THE INVENTION

Conventionally powered rotating airfoil winged aircraft, such as propeller aircraft (e.g., prop planes) and rotorcraft (e.g., tiltrotors), are driven by a combustion engine mechanically transmitting power to the propellers and/or rotors. In some aircraft, the propeller's or rotor's mechanical drive system is replaced with direct drive electric motor systems. In some hybrid rotorcraft designs, a combustion engine may drive a first (e.g., main) rotor while a separate electric system is used to drive one or more second (e.g., anti-torque) rotors. This approach can be used to improve rotorcraft propulsion systems, for example, to reduce noise, reduce weight, or to improve safety. Various other types of hybrid rotorcraft and hybrid propeller aircraft are known. Both electric and hybrid aircraft designs require multiple batteries to be stored on the aircraft. Typically, such batteries are stored in the fuselage of the aircraft.

BRIEF SUMMARY OF THE INVENTION

In a first aspect, the present disclosure is directed to a wing for an aircraft. The wing includes (a) a first end; (b) a second end; (c) a skin extending longitudinally from the first end to the second end; and (d) at least one channel positioned within the skin and extending longitudinally between the first and second ends, wherein the at least one channel defines a longitudinal translation path for translating at least one electrical power source longitudinally between the first and second ends. In some embodiments, the first end includes an outboard wing tip. In this regard, the outboard wing tip may include an opening, wherein the at least one channel extends longitudinally from the opening toward the second end. The wing may further include a covering member configured to selectively cover and uncover the opening. For example, the covering member may include a nacelle rotatable between horizontal and vertical orientations for selectively covering and uncovering the opening, respectively. In addition or alternatively, the covering member may include an access panel movable between closed and open states for selectively covering and uncovering the opening, respectively. In some embodiments, the second end includes one of a root or a carry-through region, wherein the at least one channel extends longitudinally from the outboard wing tip to the one of a root or a carry-through region.

In some embodiments, the first and second ends define a wing length, wherein the at least one channel has a channel length substantially equal to the wing length. In addition or alternatively, the at least one channel may include a forward channel and an aft channel. In some embodiments, the wing further includes at least one spar positioned within the skin and extending longitudinally between the first and second ends. In this regard, the at least one spar may at least partially define the at least one channel. For example, the at least one spar may include at least one vertical spar web, wherein the at least one channel is defined by the at least one vertical spar web and one of a leading edge or a trailing edge of the wing.

In some embodiments, the wing further includes at least one battery positioned within the at least one channel and configured to translate longitudinally between the first and second ends along the longitudinal translation path. In this regard, the at least one battery may include a wedge. In addition or alternatively, the at least one channel may be free of protrusions extending thereacross.

In a second aspect, the present disclosure is directed to an aircraft including (a) a fuselage; and (b) a wing operatively coupled to the fuselage and extending longitudinally between first and second ends, wherein the wing includes at least one channel extending longitudinally between the first and second ends, wherein the at least one channel defines a longitudinal translation path for translating at least one electrical power source longitudinally between the first and second ends. In some embodiments, the aircraft further includes at least one battery positioned within the at least one channel and configured to translate longitudinally between the first and second ends along the longitudinal translation path.

In a third aspect, the present disclosure is directed to a method of storing an electrical power source on an aircraft. The method includes (a) inserting the electrical power source into a longitudinally-extending channel provided in a wing of the aircraft; and (b) translating the electrical power source longitudinally within the channel. In some embodiments, translating the electrical power source longitudinally within the channel includes translating the electrical power source toward a fuselage of the aircraft. In addition or alternatively, the method may further include selectively uncovering an opening provided in the wing, wherein inserting the electrical power source into the channel includes inserting the electrical power source through the opening.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Due to the size and weight of each battery (e.g., greater than 300 pounds), storing batteries in a fuselage of an aircraft may undesirably increase the size of the fuselage, as well as the weight of the aircraft and the amount of drag experienced by the aircraft during flight operations. In the case of conventionally powered winged aircraft, liquid fuel is commonly stored in the wings and transferred into and out of each wing by simply pumping the liquid fuel through a relatively small access hole provided in the upper and/or lower skin of each wing. It would be desirable to use a similar location for storing batteries. However, such batteries are typically relatively large, and must be frequently accessed and/or removed from the aircraft for maintenance purposes. Moreover, conventional aircraft wings include a plurality of internal support members in the form of wing ribs spaced apart along the wing's length and extending in the chordwise direction between forward and aft spars of the wing and in the vertical direction between the upper and lower skins, which would reduce the space available for batteries as well as constrain each battery to a particular compartment along the length of the respective wing (e.g., defined between adjacent wing ribs). Thus, such batteries would require multiple relatively large access holes to be provided along the lengths of the upper and/or lower skin of each wing to facilitate access to and removal of the batteries from the respective compartments. Such a multiplicity of large access holes through the wing structure may undesirably result in increased weight (e.g., due to the additional material which must be added to the wing to overcome any weaknesses introduced by such holes), as well as increased concerns regarding the structural integrity of the wing and/or increased maintenance needs.

Figure 1A:
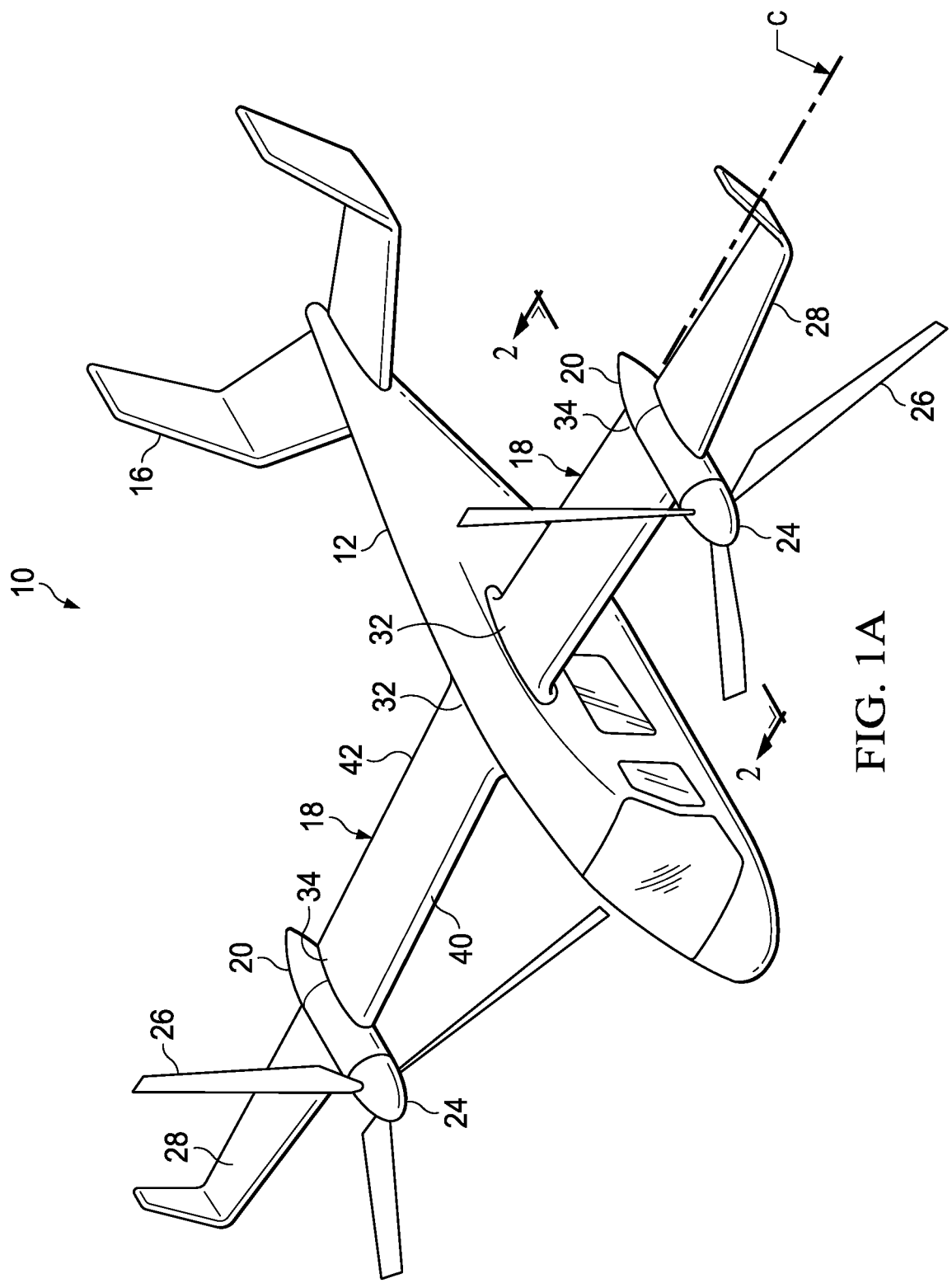
FIG. 1A is a perspective view of an exemplary tiltrotor aircraft having wings with batteries selectively housed therein, showing the aircraft in a forward flight mode.
Figure 1B:
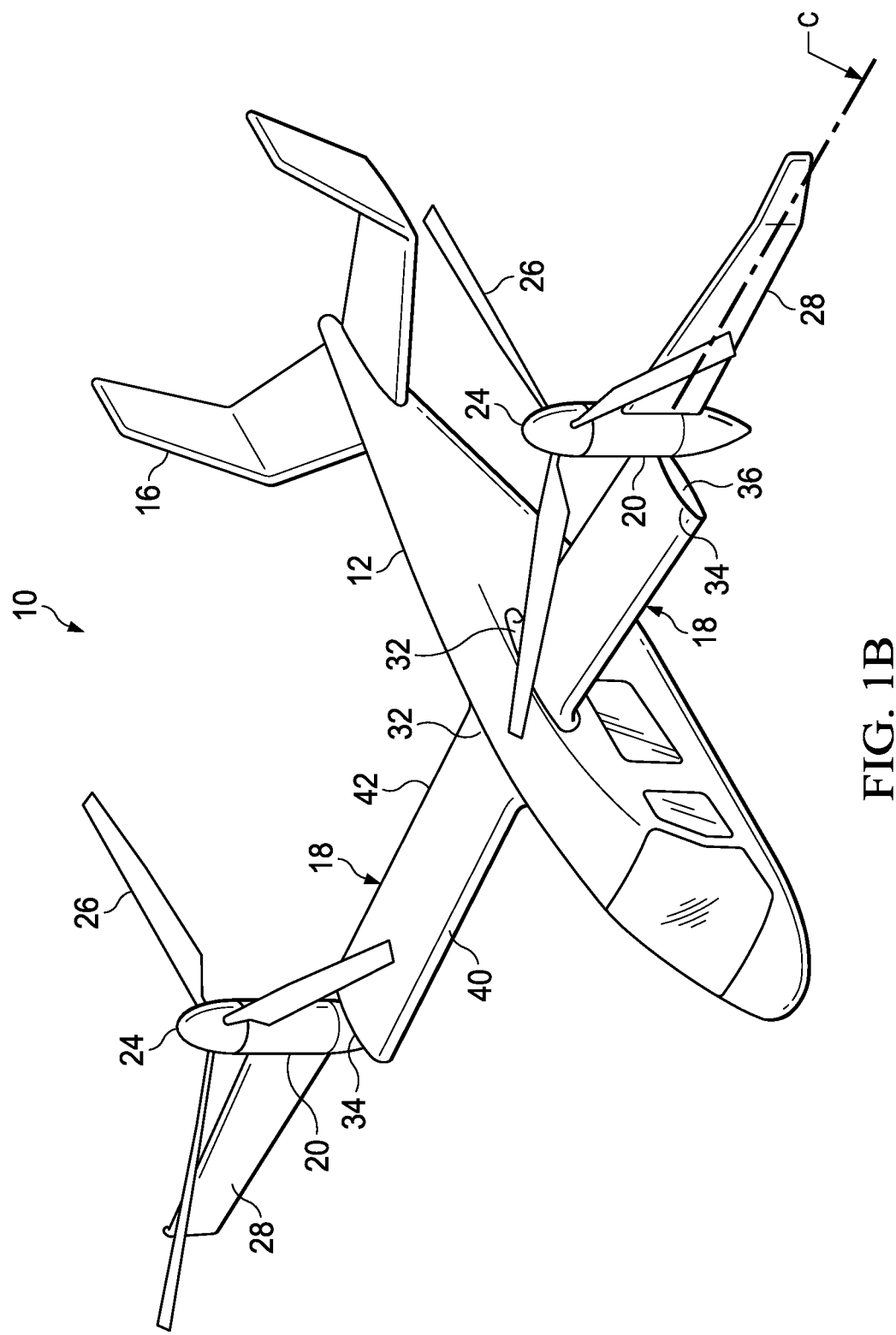
FIG. 1B is a perspective view of the aircraft of FIG. 1A, showing the aircraft in a vertical takeoff and landing flight mode.

Referring now to FIGS. 1A and 1B, a tiltrotor aircraft is schematically illustrated and generally designated 10. Aircraft 10 includes a fuselage 12 and a tail assembly 16 having control surfaces operable for horizontal and/or vertical stabilization during forward flight. A pair of opposed inboard wings 18 are supported by fuselage 12. Together, fuselage 12, tail assembly 16 and inboard wings 18 as well as their various frames, longerons, stringers, bulkheads, spars, ribs and skins, may be considered to be the airframe of tiltrotor aircraft 10.

Figure 2:
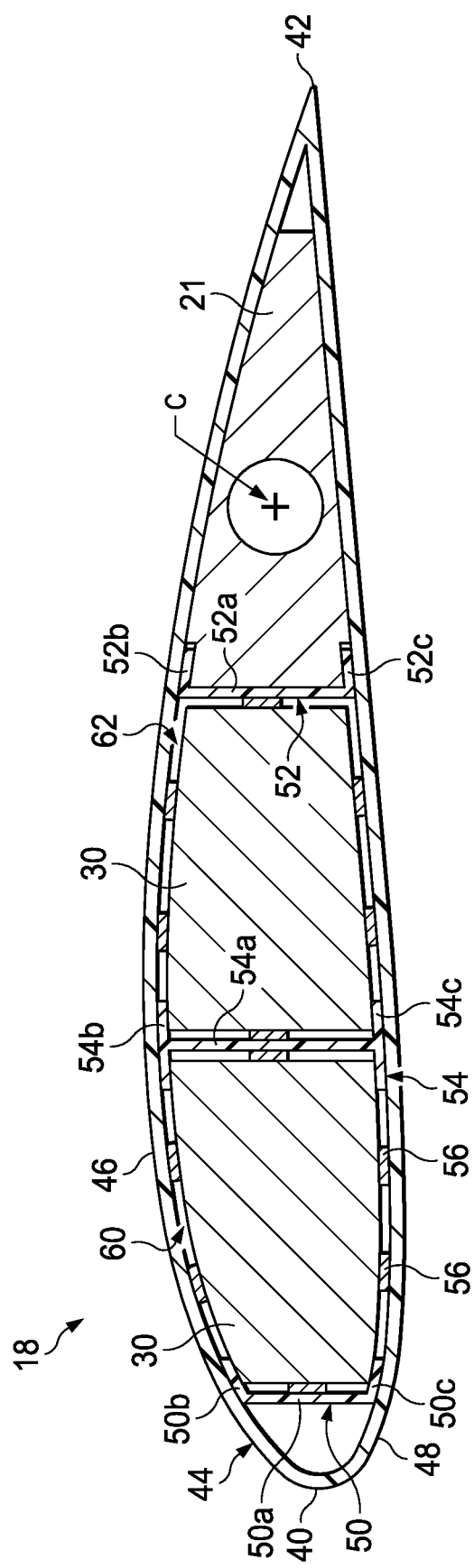
FIG. 2 is a cross-sectional view of a wing of the aircraft of FIG. 1A, taken along section line 2-2 in FIG. 1A.

Located proximate the outboard ends of inboard wings 18 are rotatable nacelles 20. Each nacelle 20 is rotatable about a respective conversion axis C relative to the corresponding inboard wing 18 between a generally horizontal orientation, as best seen in FIG. 1A, and a generally vertical orientation, as best seen in FIG. 1B, via a corresponding conversion motor 21 (FIG. 2). Each nacelle 20 includes a rotatable portion of the drive system and a proprotor system 24 that is rotatable responsive to torque and rotational energy provided via the drive system. In the illustrated embodiment, proprotor systems 24 each include three proprotor blades 26. It should be understood by those having ordinary skill in the art, however, that proprotor assemblies 24 could alternatively have a different number of proprotor blades, either less than or greater than three. In addition, it should be understood that the position of nacelles 20, the angular velocity or revolutions per minute (RPM) of the proprotor systems 24, the pitch of proprotor blades 26 and the like are controlled by the pilot of tiltrotor aircraft 10 and/or the flight control system to selectively control the direction, thrust and lift of tiltrotor aircraft 10 during flight. In the example shown, each nacelle 20 further includes an outboard wing 28.

FIG. 1A illustrates tiltrotor aircraft 10 in a forward flight mode or airplane flight mode, in which proprotor systems 24 are positioned to rotate in a substantially vertical plane to provide a forward thrust while a lifting force is supplied by wings 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 24 are positioned to rotate in a substantially horizontal plane to provide a vertical thrust such that tiltrotor aircraft 10 flies much like a conventional helicopter. The outboard wings 28 shown in FIGS. 1A and 1B are each positioned vertically or horizontally with the corresponding proprotor system 24, respectively, to increase the wing span and wing aspect ratio, which thereby increases lift/draft ratio and aircraft efficiency and fuel economy as compared to a tiltrotor without outboard wings 28. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor systems 24 positioned between airplane flight mode and helicopter flight mode, which can be referred to as conversion flight mode.

Preferably, each rotatable nacelle 20 houses a drive system, such as an electric motor, for supplying torque and rotational energy to a respective proprotor system 24. In this regard, aircraft 10 includes a plurality of electrical power sources in the form of batteries 30 (FIG. 2) for powering the electric motors of rotatable nacelles 20 and/or other electrical components of aircraft 10. It will be appreciated that any other suitable type of electrical power source may be used in place of batteries 30, such as fuel cells or hydrogen tanks, for example. In the embodiment shown, batteries 30 are arranged within both inboard wings 18. The drive systems of each rotatable nacelle 20 may be coupled to each battery 30 such that batteries 30 on either inboard wing 18 can serve as a backup to the other batteries 30 in the event of a failure.

In the example shown, each inboard wing 18 extends longitudinally between a wing root 32 at fuselage 12 and an open wing tip 34 having an opening 36, and extends in a chordwise direction between a leading edge 40 and a trailing edge 42. As best shown in FIG. 2, each inboard wing 18 includes a torque box structure formed from a skin 44 having an upper skin portion 46 and a lower skin portion 48, a forward spar 50 and an aft spar 52. In the present version, each inboard wing 18 also includes an intermediate or main spar 54 positioned between forward and aft spars 50, 52 as well as a plurality of wing skin stiffeners in the form of stringers 56 attached to upper and lower skin portions 46, 48 that extend generally parallel to the longitudinal axis of the corresponding wing 18 to provide stiffness and support to the skin portions 46, 48. As shown, forward and aft spars 50, 52 include generally vertical spar webs 50a, 52a respectively, and upper L-shaped spar caps 50b, 52b extending therefrom toward trailing edge 42, and lower L-shaped spar caps 50c, 52c also extending toward trailing edge 42, such that forward and aft spars 50, 52 each have a generally C-shaped cross section. Main spar 54 includes a generally vertical spar web 54a and upper and lower T-shaped spar caps 54b, 54c extending therefrom toward both leading and trailing edges 40, 42 such that main spar 54 has a generally I-shaped cross section. The various torque box components may be joined together by adhesive bonding or using aerospace fasteners such as pins, screws, rivets or other suitable fastening means to form the torque box structure of each wing 18. As shown, each conversion motor 21 of the present example is housed within the corresponding wing 18 between the respective aft spar 52 and trailing edge 42, such that the conversion axis C of the respective rotatable nacelle 20 is in a relatively aft position (e.g., relatively proximate to trailing edge 42 and relatively distal from leading edge 40). For example, conversion axis C may be spaced apart from leading edge 40 by a distance that is approximately 70% of a chord of wing 18. It will be appreciated that each wing 18 may be configured in any other suitable manner, such as similarly to any of those described below with reference to FIGS. 9-14, for example.

Unlike conventional tiltrotor wing configurations, wings 18 of the present version do not include a plurality of wing ribs spaced apart along the length of each wing 18 and extending in the chordwise direction between forward and aft spars 50, 52 and in the vertical direction between upper and lower skin portions 46, 48. Such a ribless configuration may be generally similar to that of helicopter rotor blades and/or wind turbine rotor blades. Thus, a longitudinally-extending forward channel 60 is defined by forward spar 50 and main spar 54 (together with any stringers 56 positioned therebetween), and a longitudinally-extending aft channel 62 is defined by aft spar 52 and main spar 54 (together with any stringers 56 positioned therebetween). Each channel 60, 62 extends along substantially an entire length of the corresponding wing 18. For example, each channel 60, 62 may extend from the root 32 of the respective wing 18 to the corresponding opening 36 in the open wing tip 34 of the respective wing 18. In some versions, wing 18 may be substantially untapered in the chordwise and/or vertical directions, such that channels 60, 62 may each have a substantially constant width and/or height along their respective lengths. Since there are no wing ribs protruding across channels 60, 62 and, more particularly, no wing ribs protruding across channels 60, 62 in the chordwise direction, channels 60, 62 may each define a substantially unobstructed straight, longitudinal translation path along which respective batteries 30 may be slid or otherwise translated for inserting and removing batteries 30 into and out of the corresponding wing 18 through opening 36 of open wing tip 34.

In this regard, each channel 60, 62 may be sized and shaped to selectively receive a predetermined number of batteries 30 having a predetermined configuration. For example, batteries 30 may be loaded into each wing 18 by inserting each battery 30 into a selected channel 60, 62 through the corresponding opening 36 and longitudinally translating each battery 30 along the selected channel 60, 62 toward the corresponding root 32, such that each channel 60, 62 may be substantially entirely occupied by batteries 30 along the length of the corresponding wing 18 from the root 32 to the open wing tip 34. Conversely, batteries 30 may be unloaded from each wing 18 by longitudinally translating a selected battery 30 along the respective channel 60, 62 toward the corresponding open wing tip 34 and removing each selected battery 30 from the channel 60, 62 through the corresponding opening 36. Each battery 30 may span substantially the entire length of the corresponding wing 18, and/or may be divided into a plurality of discrete battery segments 30a-30e (FIG. 3A) which collectively span substantially the entire length of the corresponding wing 18.

In the example shown, any one or more of spar webs 50a, 52a, 54a, spar caps 50b, 50c, 52b, 52c, 54b, 54c, and/or stringers 56 may provide longitudinally-continuous bearing surfaces or track surfaces to assist with guiding the longitudinal translation of batteries 30 along the respective channels 60, 62. In some versions, wings 18 and batteries 30 may include interlocking longitudinally-extending rails and grooves (not shown) configured to cooperate with each other to further assist with guiding such longitudinal translation of batteries 30.

In the present version, various functionalities of the wing ribs which are omitted from wings 18 may be provided by the batteries 30 themselves. More particularly, batteries 30 may provide the structural support to wings 18 which wing ribs would otherwise provide. For example, when positioned within the respective channels 60, 62 batteries 30 may mechanically engage each of the corresponding spars 50, 52, 54 and/or stringers 56, thereby reinforcing the torque box structure of the corresponding wing 18 and improving its stability to assist in preventing buckling of the wing 18. In addition or alternatively, batteries 30 may assist in transferring shear forces between the various torque box components of the wing 18. As shown, batteries 30 may be sized and shaped relative to the corresponding spars 50, 52, 54 and/or stringers 56 to provide a sliding clearance fit therebetween, such as by having a size and shape substantially similar to that of the channel 60, 62 defined by the corresponding spars 50, 52, 54 and stringers 56 (e.g., by tracking the relatively straight/flat spar webs 50a, 52a, 54a of the corresponding spars 50, 52, 54 and the relatively contoured skin portions 46, 48 along which the corresponding stringers 56 are arranged). In some versions, fasteners (not shown) may selectively fix batteries 30 against movement relative to the respective wings 18. For example, removable aerospace fasteners such as pins, screws or other suitable fastening means may extend from upper skin portion 46, through each battery 30 (e.g., through a case thereof), to lower skin portion 48 for inhibiting inadvertent movement of batteries 30 within the respective wings 18, such as during flight operations.

While the present version does not include any wing ribs, it will be appreciated that a reduced number of wing ribs compared to conventional tiltrotor wing configurations may be provided. For example, a reduced number of wing ribs (not shown) may be positioned at or near the root 32 of each wing 18. Such wing ribs may effectively shorten the length of the corresponding channels 60, 62. Rather than extending from the open wing tip 34 to the root 32, channels 60, 62 shortened in such a manner may only extend from the open wing tip 34 to the most outboard wing rib of the respective wing 18.

As described above, each wing 18 of the present version includes an open wing tip 34 for facilitating insertion and removal of batteries 30 into and out of the wing 18. As also described above, each nacelle 20 of the present version is rotatable relative to the corresponding inboard wing 18 between a generally horizontal orientation and a generally vertical orientation.

Figure 3A:
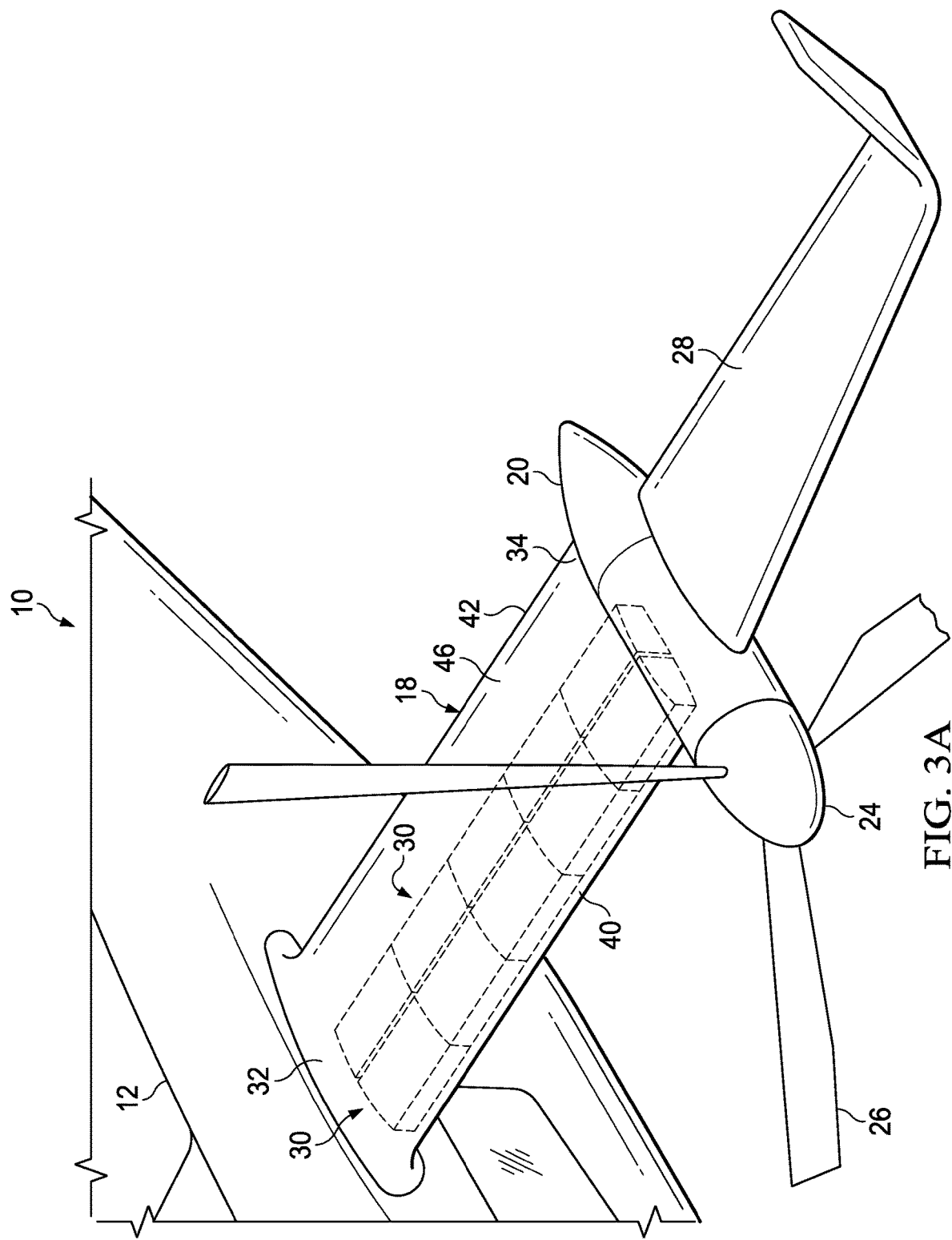
FIG. 3A is a perspective view of the wing of FIG. 2, showing a nacelle rotatably coupled to the wing and in a generally horizontal orientation.
Figure 3B:
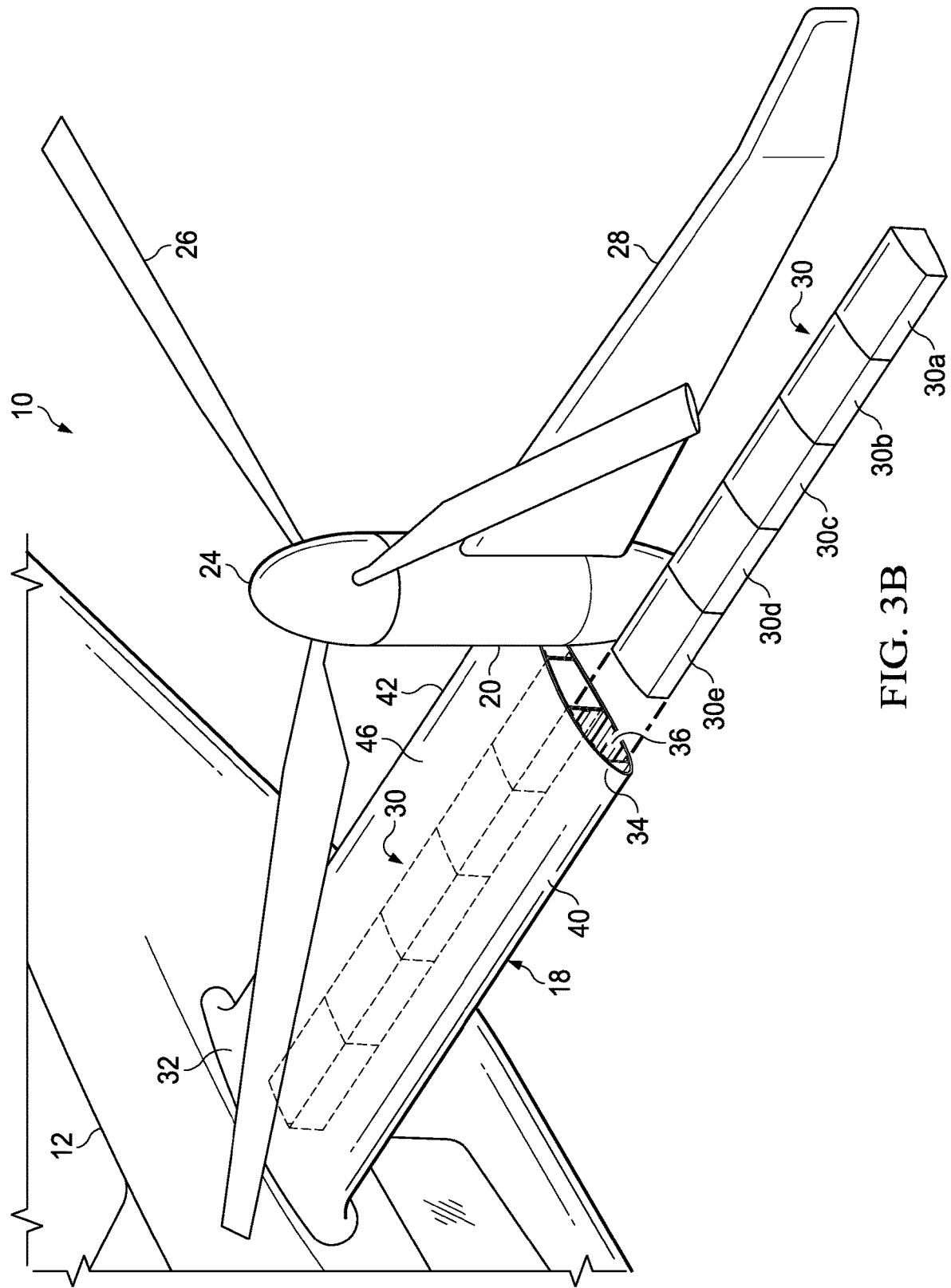
FIG. 3B is a perspective view of the wing of FIG. 2, showing the nacelle in a generally vertical orientation.

As shown in FIG. 3A, when nacelle 20 is in the generally horizontal orientation, nacelle 20 may fully cover opening 36 of open wing tip 34 for enclosing the corresponding channels 60, 62 to protect the batteries 30 contained therein from an external environment surrounding aircraft 10, assist in securing such batteries 30 within the corresponding channels 60, 62, and/or restrict access to such batteries 30. As shown in FIG. 3B, when nacelle 20 is in the generally vertical orientation, nacelle 20 may at least partially uncover opening 36 of open wing tip 34 for exposing the corresponding channels 60, 62 to provide access thereto, such as for inserting and removing batteries 30. In this manner, each nacelle 20 may selectively cover and uncover opening 36 of open wing tip 34. In some versions, an access panel or door (not shown) may be selectively coupled to each open wing tip 34 at opening 36, such that each nacelle 20 may selectively cover and uncover the access door, which may then be selectively moved between open and closed states for uncovering and covering opening 36. Alternatively, nacelles 20 may be omitted, or may be fixed against movement relative to the corresponding inboard wing 18. In such cases, the access door alone may be used to selectively uncover and cover opening 36, as described below with respect to FIGS. 7A and 7B.

By storing batteries 30 within wings 18, aircraft 10 may provide an improved weight distribution lowering the bending moment at roots 32 by a significant margin as compared to aircraft which store batteries in the fuselage (e.g., about a 30% reduction), also reducing the overall weight of aircraft 10. In addition, such storage of batteries 30 within wings 18 may reduce center of gravity issues which may otherwise result from storing batteries in fuselage 12. Moreover, storing batteries 30 within wings 18 rather than fuselage 12 allows a smaller, more compact configuration of fuselage 12 which may reduce the weight of aircraft 10 and the amount of drag experienced by aircraft 10 during flight operations. Positioning batteries 30 outboard of the break point of wings 18 may lower crashworthiness loads on fuselage 12 and any corresponding gear, thereby further reducing the weight of aircraft 10. Furthermore, positioning batteries 30 within wings 18 rather than fuselage 12 separates batteries 30 from passengers and/or cargo within fuselage 12, thereby reducing fire risk. Dual use of batteries 30 as both power sources and as structural components of wings 18 to prevent buckling and transfer shear forces may allow additional reduction of the weight of aircraft 10. Batteries 30 may also provide inertia relief to assist with minimizing bending of wings 18. In some versions, dividing each battery 30 into a plurality of battery segments 30a-30e may assist with handling of batteries 30 and management of bending loads. It will be appreciated that a greater volume of batteries 30 may be accommodated within each wing 18 by increasing a chord of each wing 18, a thickness of each wing 18, and/or a length of each wing 18, for example.

Figure 4A:
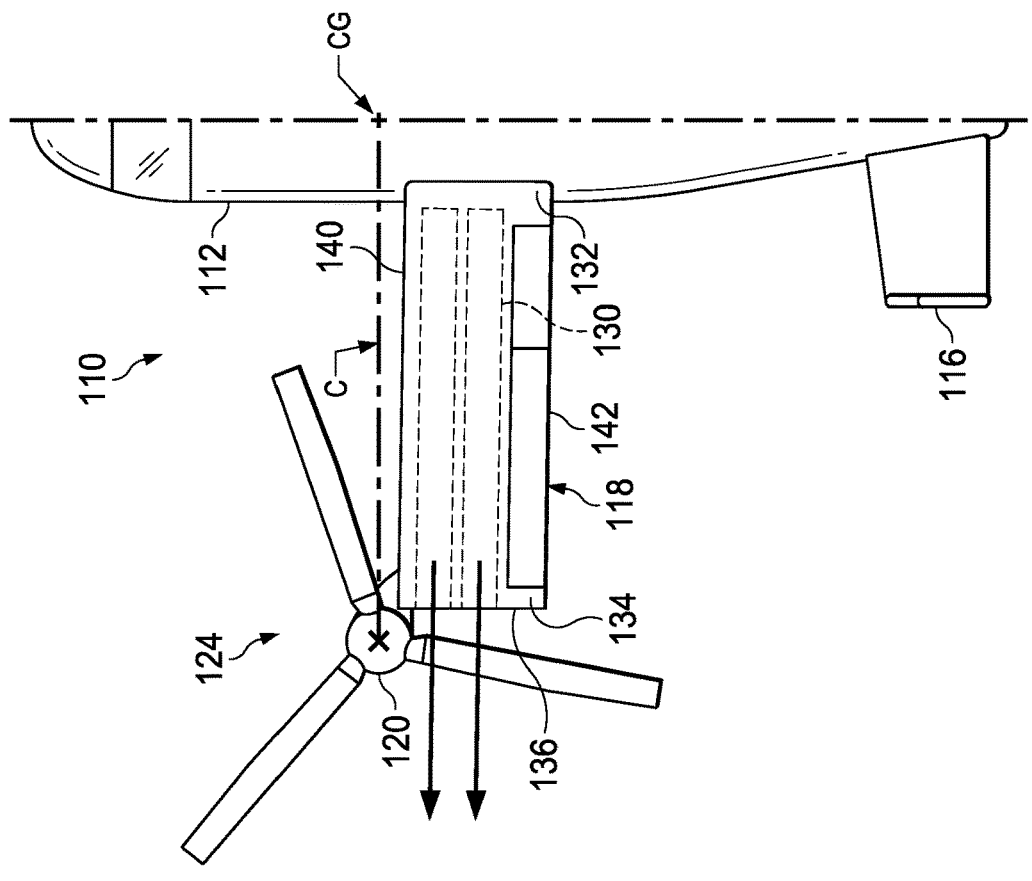
FIG. 4A is a partial top plan view of another exemplary tiltrotor aircraft having wings with batteries selectively housed therein, showing the aircraft in a forward flight mode.
Figure 4B:
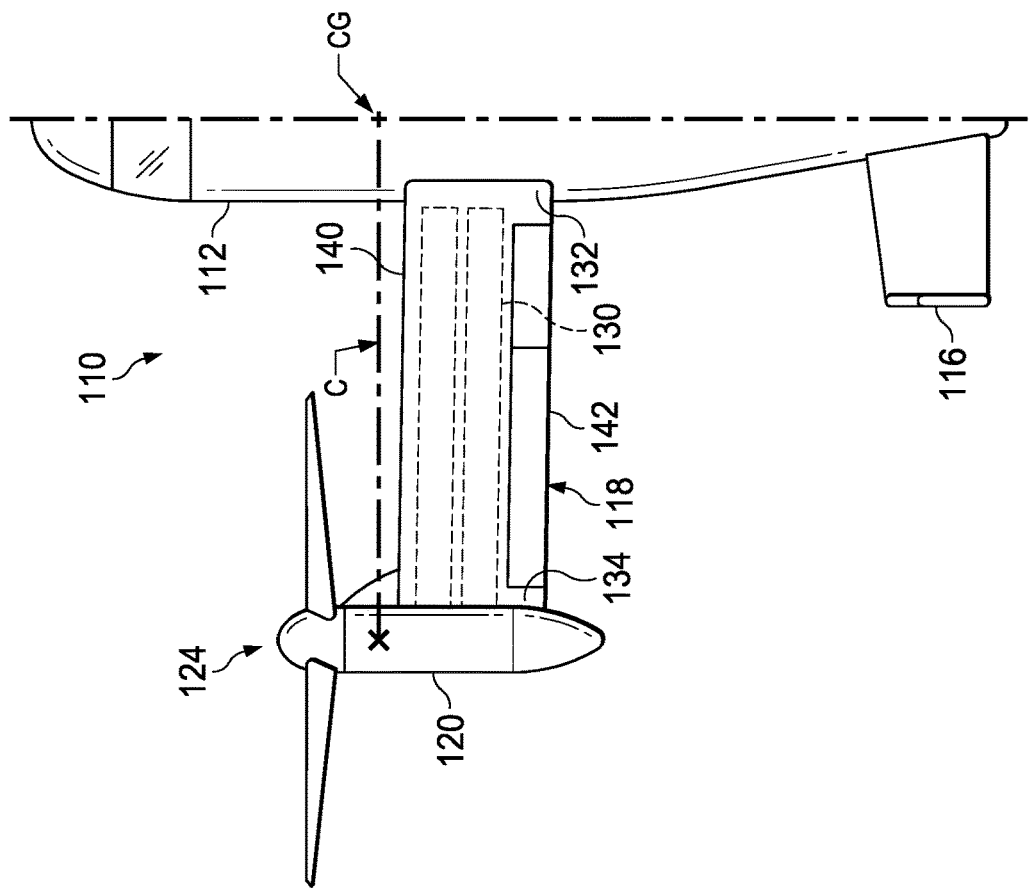
FIG. 4B is a partial top plan view of the aircraft of FIG. 4A, showing the aircraft in a vertical takeoff and landing flight mode.
Figure 5A:
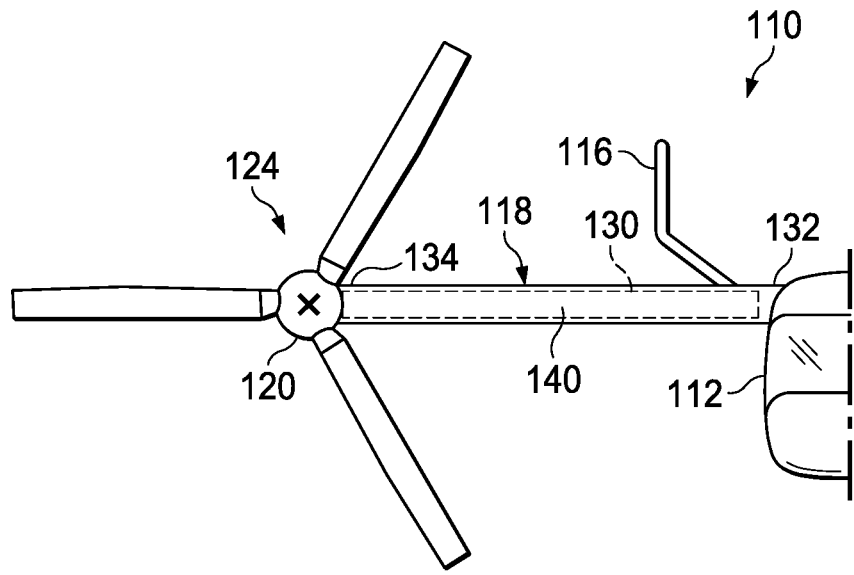
FIG. 5A is a front elevational view of the aircraft of FIG. 4A, showing the aircraft in the forward flight mode.
Figure 5B:
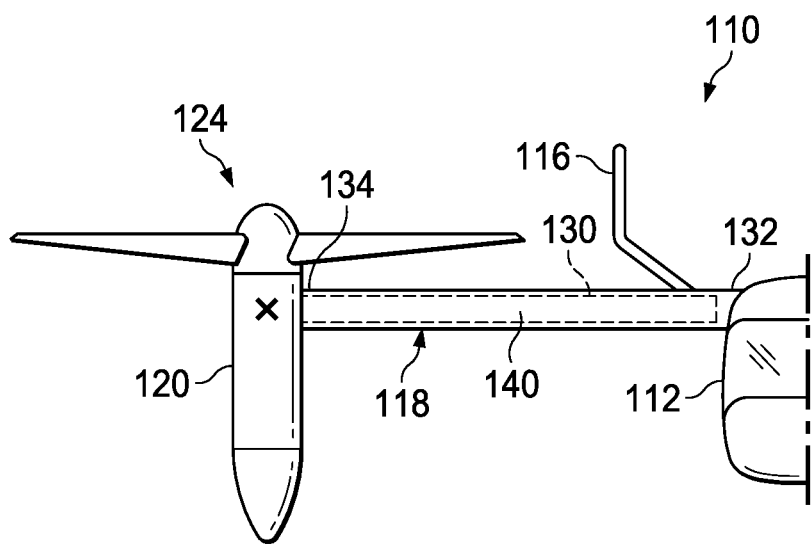
FIG. 5B is a front elevational view of the aircraft of FIG. 4A, showing the aircraft in the vertical takeoff and landing flight mode.

Referring now to FIGS. 4A-5B, an alternative tiltrotor aircraft 110 similar to aircraft 10 except as otherwise described herein includes a fuselage 112, a tail assembly 116, and a pair of opposed wings 118 (one shown). Located proximate the outboard ends of wings 118 are rotatable nacelles 120 (one shown), each rotatable about a respective conversion axis C relative to the corresponding wing 118 between a generally horizontal orientation, as best seen in FIGS. 4A and 5A, and a generally vertical orientation, as best seen in FIGS. 4B and 5B, via a corresponding conversion motor (not shown). Each nacelle 120 includes a rotatable portion of the drive system and a proprotor system 124. Each wing 118 extends longitudinally between a wing root 132 at fuselage 112 and an open wing tip 134 having an opening 136, and extends in a chordwise direction between a leading edge 140 and a trailing edge 142, and may have a substantially ribless configuration with one or more longitudinally-extending channels (not shown) for receiving batteries 130 through opening 136 and translating batteries 130 longitudinally (e.g., toward root 132). As shown in FIG. 4A, when nacelle 120 is in the generally horizontal orientation, nacelle 120 may fully cover opening 136 of open wing tip 134 for enclosing the corresponding channels of the respective wing 118. As shown in FIG. 4B, when nacelle 120 is in the generally vertical orientation, nacelle 120 may at least partially uncover opening 136 of open wing tip 134 for exposing the corresponding channels of the respective wing 118 to provide access thereto, such as for inserting and removing batteries 130.

Rather than being in a relatively aft position, the conversion axis C of each rotatable nacelle 120 of the present version is in a relatively forward position (e.g., relatively proximate to leading edge 140 and relatively distal from trailing edge 142). Such a configuration may include housing each conversion motor within the corresponding wing 118 between a forward spar (not shown) of wing 118 and leading edge 140, for example. As shown, the center of gravity CG of aircraft 110 is maintained at a consistent location along a length of fuselage 112 irrespective of whether nacelles 120 are in the generally horizontal or generally vertical orientation.

Figure 6A:
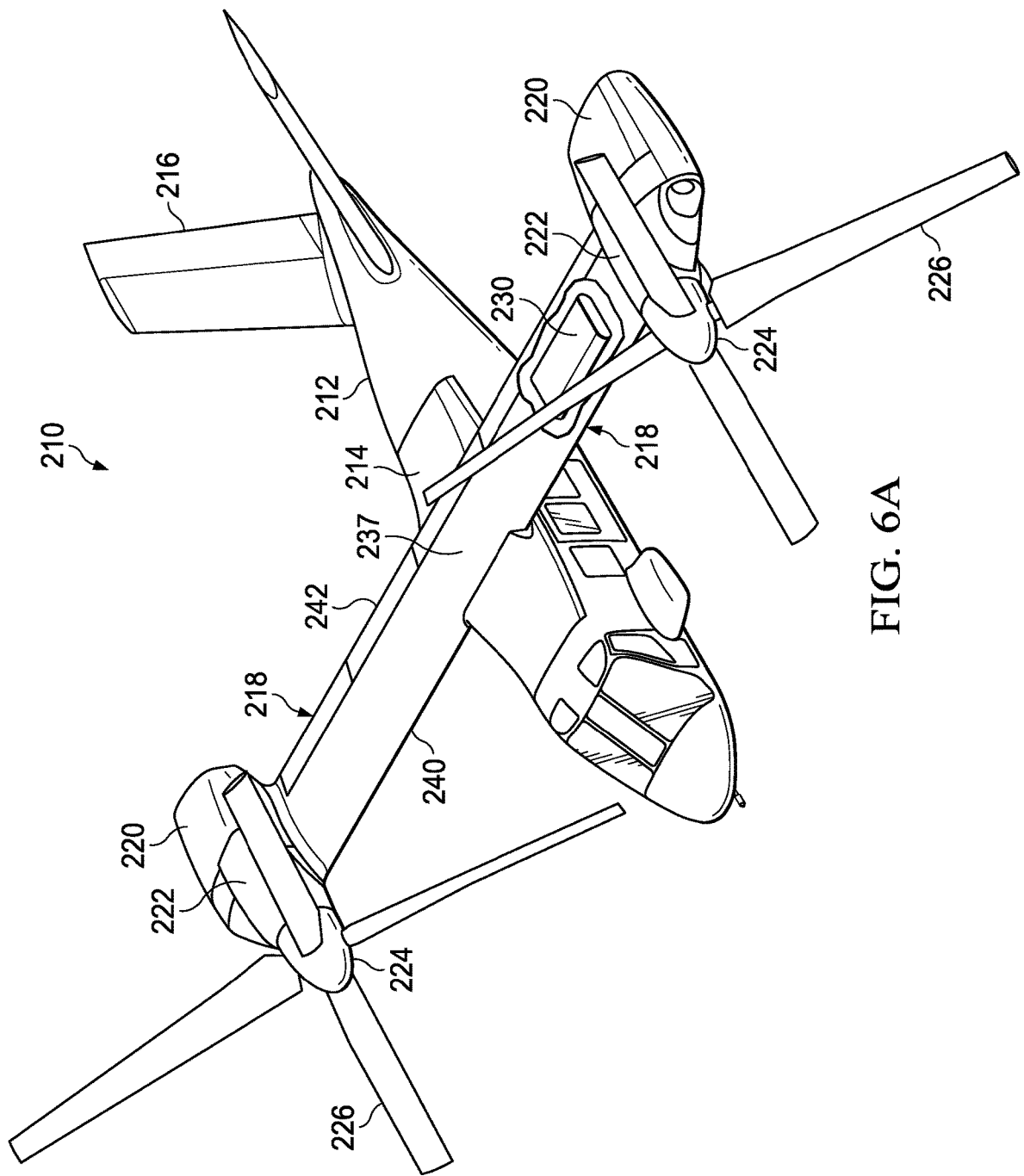
FIG. 6A is a perspective view of another exemplary tiltrotor aircraft having wings with batteries selectively housed therein, showing the aircraft in a forward flight mode.
Figure 6B:
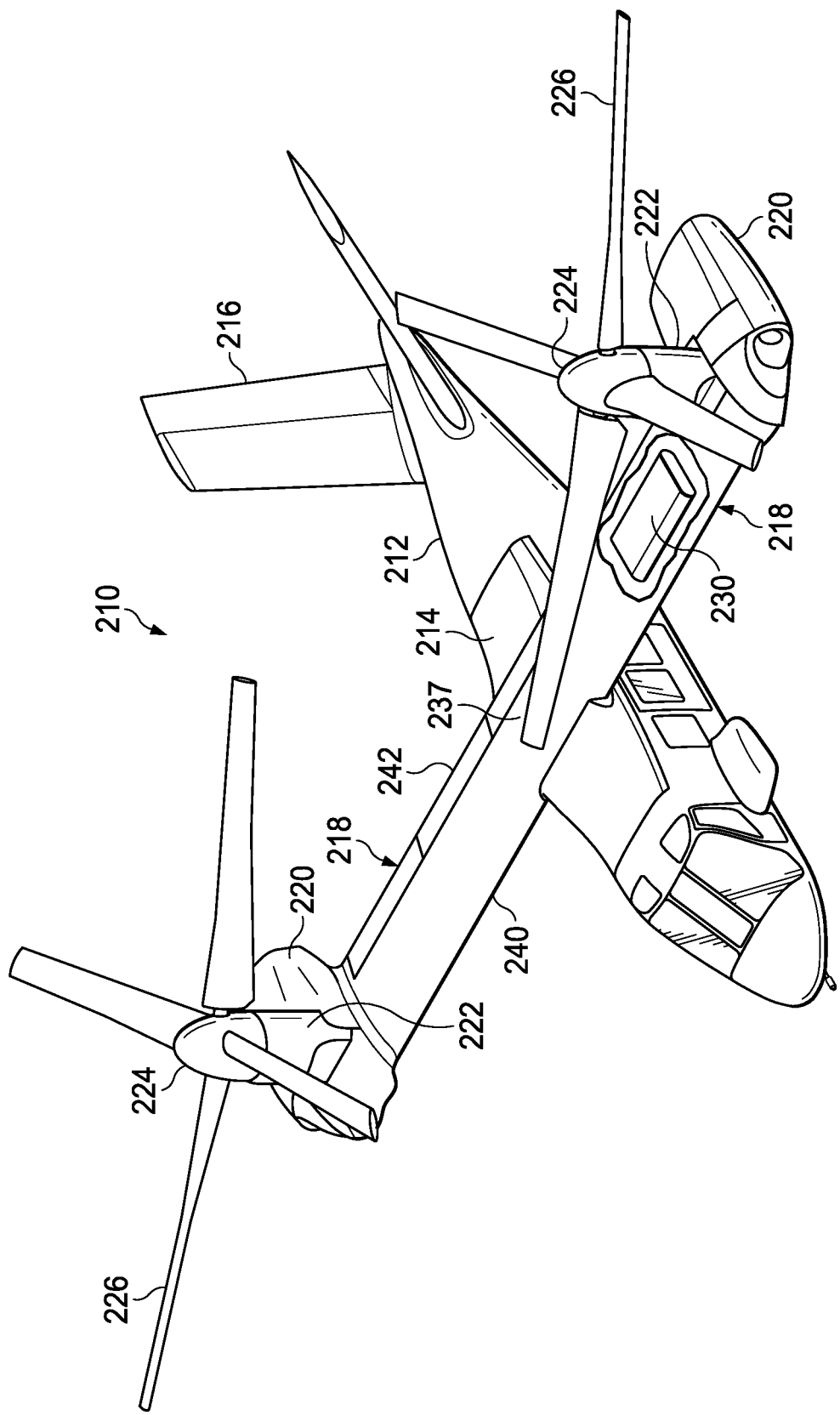
FIG. 6B is a perspective view of the aircraft of FIG. 6A, showing the aircraft in a vertical takeoff and landing flight mode.

Referring now to FIGS. 6A and 6B, an alternative tiltrotor aircraft 210 similar to aircraft 10 except as otherwise described herein includes a fuselage 212, a wing mount assembly 214 that is rotatable relative to fuselage 212, and a tail assembly 216. A pair of opposed wings 218 are supported by wing mount assembly 214 and rotate with wing mount assembly 214 relative to fuselage 212 to enable tiltrotor aircraft 210 to convert to a storage configuration. These and various other components of aircraft 210 may be configured in accordance with at least some of the teachings of U.S. Pat. No. 10,457,378, entitled "Mechanically Joining Airframe Members At Solid Insert," issued Oct. 29, 2019, the disclosure of which is incorporated by reference herein.

Located proximate the outboard ends of wings 218 are fixed nacelles 220, each of which preferably houses an electric motor. A corresponding pylon assembly 222 is rotatable relative to each fixed nacelle 220 and respective wing 218 between a generally horizontal orientation, as best seen in FIG. 6A, and a generally vertical orientation, as best seen in FIG. 6B. Each pylon assembly 222 includes a rotatable portion of the drive system and a proprotor system 224 that is rotatable responsive to torque and rotational energy provided via the electric motor and drive system. In the illustrated embodiment, proprotor systems 224 each include four proprotor blades 226. It should be understood by those having ordinary skill in the art, however, that proprotor assemblies 224 could alternatively have a different number of proprotor blades, either less than or greater than four. In addition, it should be understood that the position of pylon assemblies 222, the angular velocity or revolutions per minute (RPM) of the proprotor systems 224, the pitch of proprotor blades 226 and the like are controlled by the pilot of tiltrotor aircraft 210 and/or the flight control system to selectively control the direction, thrust and lift of tiltrotor aircraft 210 during flight. Wings 218 of the present version have a wing box carry-through configuration and extend longitudinally between a pair of opposed open wing tips having respective openings (not shown) via a carry-through region 237 above fuselage 212, and each extend in a chordwise direction between a leading edge 240 and a trailing edge 242. Wings 218 may have a substantially ribless configuration with one or more longitudinally-extending channels (not shown) for receiving batteries 230 through the openings and translating batteries 230 longitudinally (e.g., toward or through carry-through region 237). Such channels may each extend from a wing tip of a one wing 218 to the wing tip of the other wing 218 through carry-through region 237, or may each extend from respective wing tips to respective inboard ends at or near carry-through region 237, for example.

Rather than selectively covering and uncovering the openings of the open wing tips, fixed nacelles 220 may each be permanently positioned substantially above the opening in the respective open wing tip such that nacelles 220 may not cover the corresponding opening irrespective of whether pylon assemblies 222 are in the generally horizontal or generally vertical orientation. Such a configuration may provide improved flexibility with regard to the location of the center of gravity of aircraft 210. In some versions, an access panel or door (not shown) may be selectively coupled to each open wing tip at the respective opening, and may be selectively moved between open and closed states for uncovering and covering the respective opening, as described below with respect to FIGS. 7A and 7B.

While fixed nacelles 220 of the present version are located proximate the wing tips of wings 218, fixed nacelles 220 may alternatively be positioned inboard of such wing tips at any suitable locations along the length of wings 218. In some versions, multiple nacelles 220 may be positioned on each wing 218, and may include any suitable combination of fixed and/or rotatable nacelles. While wings 218 of the present version extend longitudinally between a pair of opposed open wing tips, wings 218 may alternatively extend longitudinally between a pair of opposed closed wing tips. In such cases, wings 218 may each include a single relatively small opening (e.g., sized to receive a single battery segment) extending through an upper or lower skin portion of the wing 218 at or near such a closed wing tip for facilitating insertion and removal of batteries 230 into and out of the wing 218, and an access panel or door (not shown) may be selectively coupled to each skin portion at the respective opening, as described below with respect to FIGS. 8A and 8B.

Figure 7A:
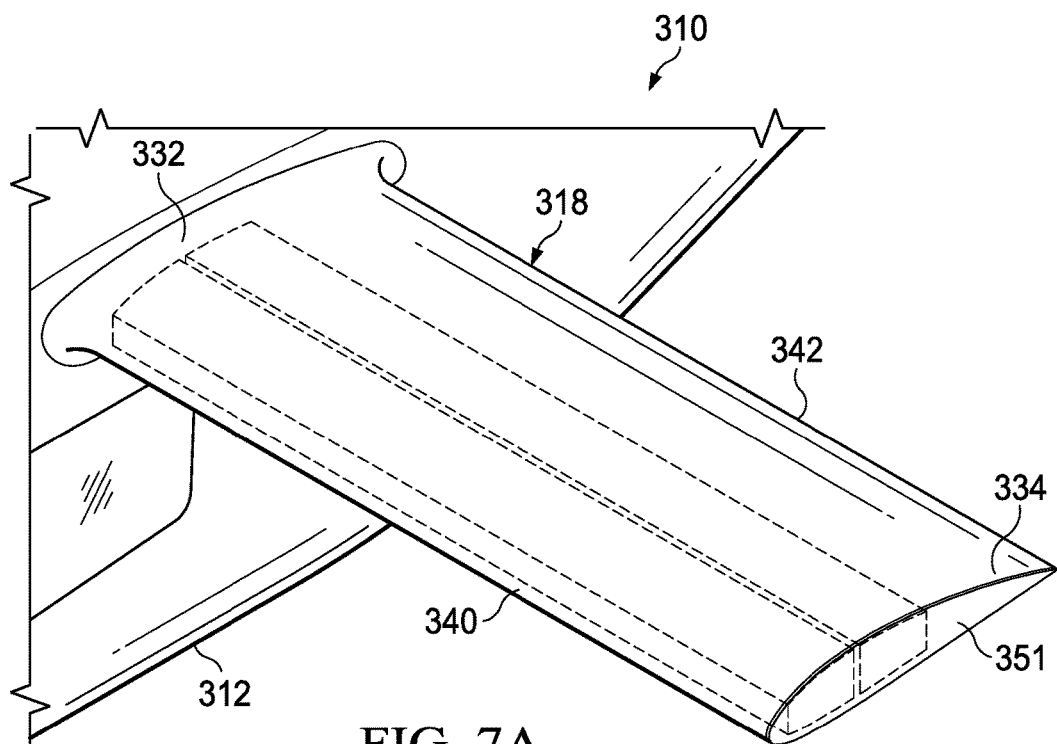
FIG. 7A is a partial perspective view of an exemplary propeller aircraft having at least one wing with batteries selectively housed therein, showing an opening in the wing tip selectively covered by an access panel.
Figure 7B:
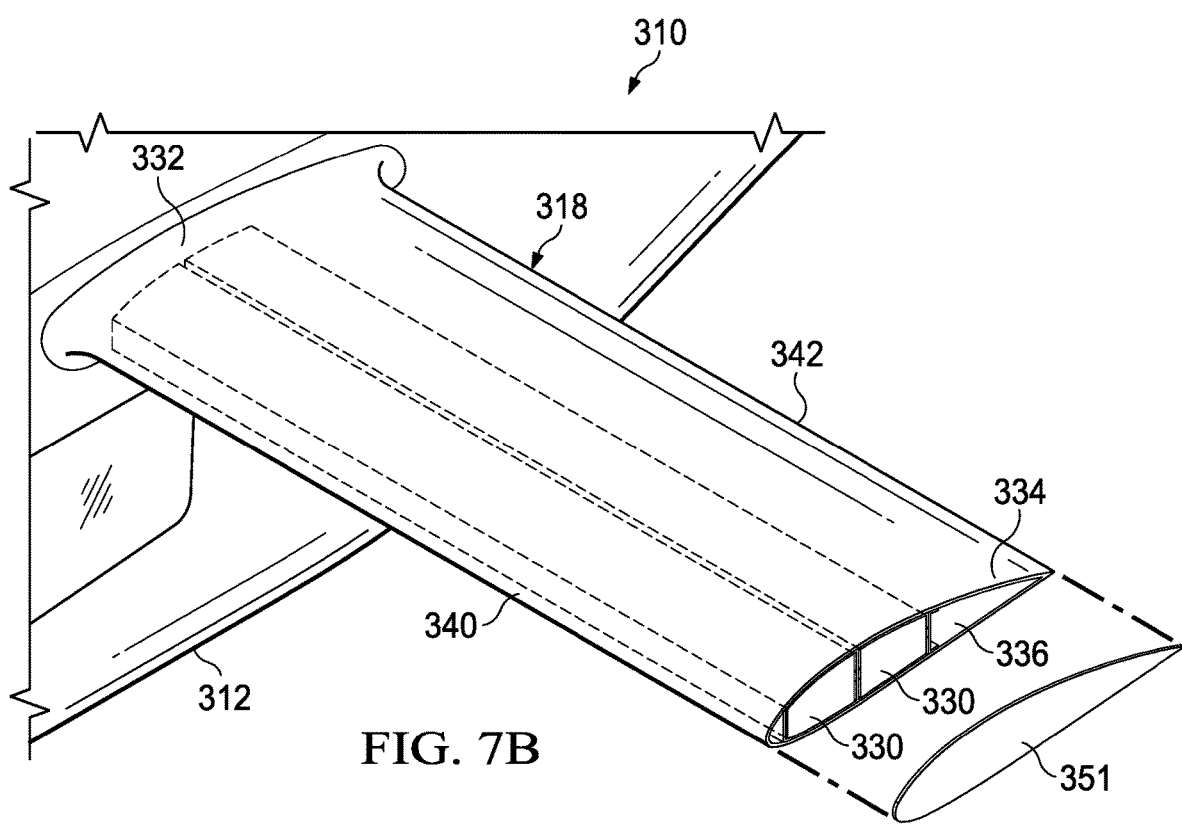
FIG. 7B is a partial perspective view of the aircraft of FIG. 7A, showing the opening in the wing tip selectively uncovered by the access panel.

Referring now to FIGS. 7A and 7B, an exemplary propeller aircraft 310 similar to aircraft 10 except as otherwise described herein includes a fuselage 312 and a pair of opposed wings 318 (one shown). Aircraft 310 may also include a propeller system (not shown) positioned at or near a nose of fuselage 312. Each wing 318 extends longitudinally between a wing root 332 at fuselage 312 and an open wing tip 334 having an opening 336, and extends in a chordwise direction between a leading edge 340 and a trailing edge 342, and may have a substantially ribless configuration with one or more longitudinally-extending channels (not shown) for receiving batteries 330 through opening 336 and translating batteries 330 longitudinally (e.g., toward root 332).

In the present version, an access panel 351 is coupled to open wing tip 334 at opening 336, and is movable between open and closed states for selectively uncovering and covering opening 336. For example, access panel 351 may be selectively coupled to open wing tip 334 to define the closed state, and may be selectively removed from open wing tip 334 to define the open state. Alternatively, access panel 351 may be movable between the open and closed states while remaining coupled to open wing tip 334. For example, access panel 351 may be pivotably coupled to open wing tip 334 via a pivot pin (not shown), and may be rotated relative to open wing tip 334 between the open and closed states. As shown in FIG. 7A, when access panel 351 is in the closed state, access panel 351 may fully cover opening 336 of open wing tip 334 for enclosing the corresponding channels of the respective wing 318. As shown in FIG. 7B, when access panel 351 is in the open state, access panel 351 may at least partially uncover opening 336 of open wing tip 334 for exposing the corresponding channels of the respective wing 318 to provide access thereto, such as for inserting and removing batteries 330.

Figure 8A:
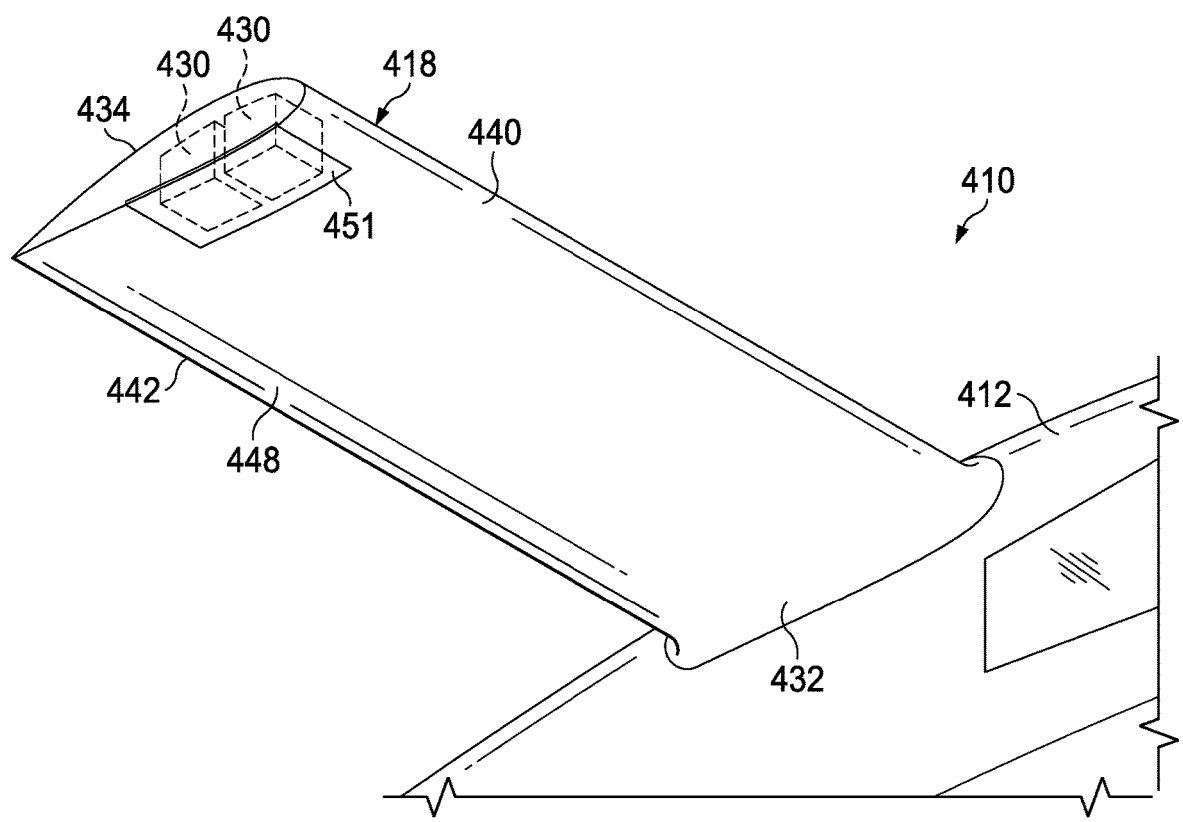
FIG. 8A is a partial perspective view of another exemplary propeller aircraft having at least one wing with batteries selectively housed therein, showing an opening in the lower wing skin portion selectively covered by an access panel.
Figure 8B:
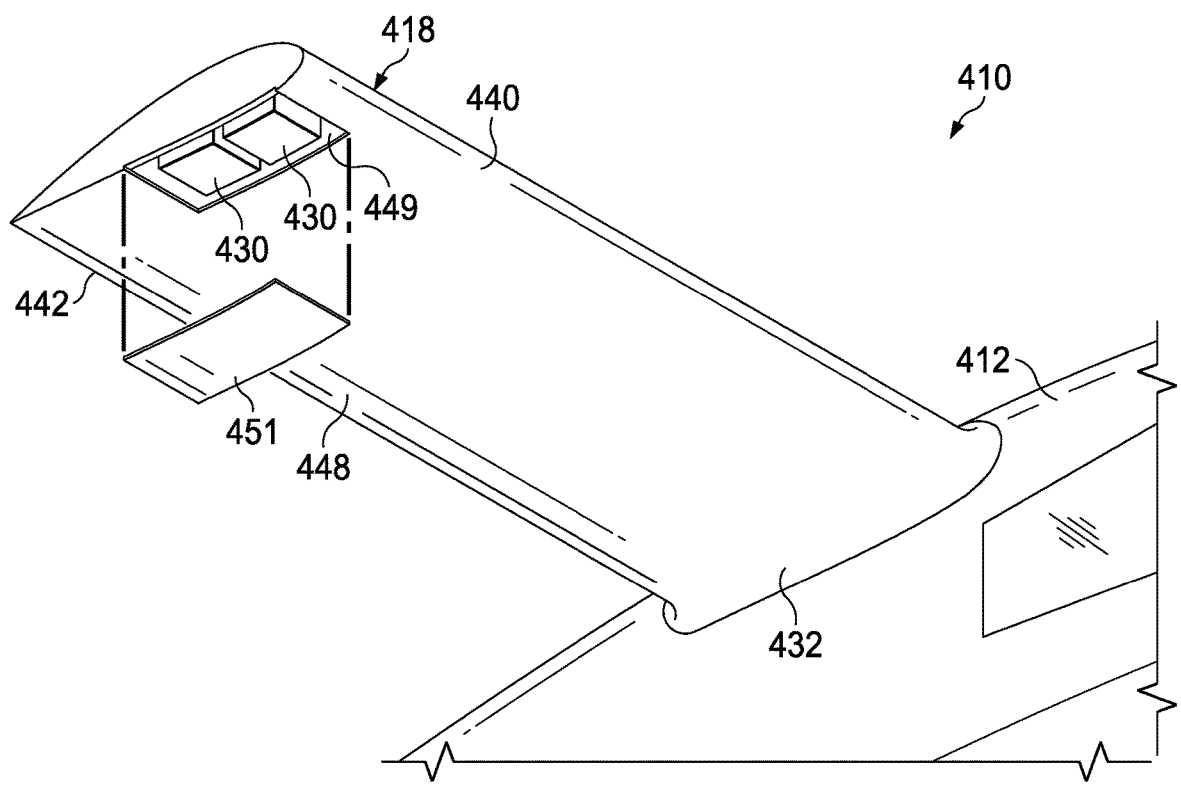
FIG. 8B is a partial perspective view of the aircraft of FIG. 8A, showing the opening in the lower wing skin portion selectively uncovered by the access panel.

Referring now to FIGS. 8A and 8B, an exemplary propeller aircraft 410 similar to aircraft 10 except as otherwise described herein includes a fuselage 412 and a pair of opposed wings 418 (one shown). Aircraft 410 may also include a propeller system (not shown) positioned at or near a nose of fuselage 412. Each wing 418 extends longitudinally between a wing root 432 at fuselage 412 and a closed wing tip 434. Each wing 418 also extends in a chordwise direction between a leading edge 440 and a trailing edge 442, and is formed from a skin extending from leading edge 440 toward trailing edge 442 and having an upper skin portion (not shown) and a lower skin portion 448. In the present version, a relatively small opening 449 is provided in lower skin portion 448 proximate to closed wing tip 434. For example, opening 449 may be sized to receive a single battery segment of each battery 430. In this regard, wing 418 may have a substantially ribless configuration with one or more longitudinally-extending channels (not shown) for receiving one or more batteries 430 through opening 436 and translating batteries 430 longitudinally (e.g., toward root 432).

In the present version, an access panel 451 is coupled to lower skin portion 448 at opening 449, and is movable between open and closed states for selectively uncovering and covering opening 449. For example, access panel 451 may be selectively coupled to lower skin portion 448 to define the closed state, and may be selectively removed from lower skin portion 448 to define the open state. Alternatively, access panel 451 may be movable between the open and closed states while remaining coupled to lower skin portion 448. For example, access panel 451 may be pivotably coupled to lower skin portion 448 via a pivot pin (not shown), and may be rotated relative to lower skin portion 448 between the open and closed states. As shown in FIG. 8A, when access panel 451 is in the closed state, access panel 451 may fully cover opening 449 of lower skin portion 448 for enclosing the corresponding channels of the respective wing 418. As shown in FIG. 8B, when access panel 451 is in the open state, access panel 451 may at least partially uncover opening 449 of lower skin portion 448 for exposing the corresponding channels of the respective wing 418 to provide access thereto, such as for inserting and removing batteries 430. While opening 449 of the present version is provided in lower skin portion 448, it will be appreciated that opening 449 may alternatively be provided in the upper skin portion.

Referring now to FIGS. 9-14, various alternative wings 518, 618, 718, 818, 918, 1018, 1118 and batteries 530, 630, 730, 830, 930, 1030, 1130 similar to wings 18 and batteries 30 except as otherwise described herein are provided.

Figure 9:
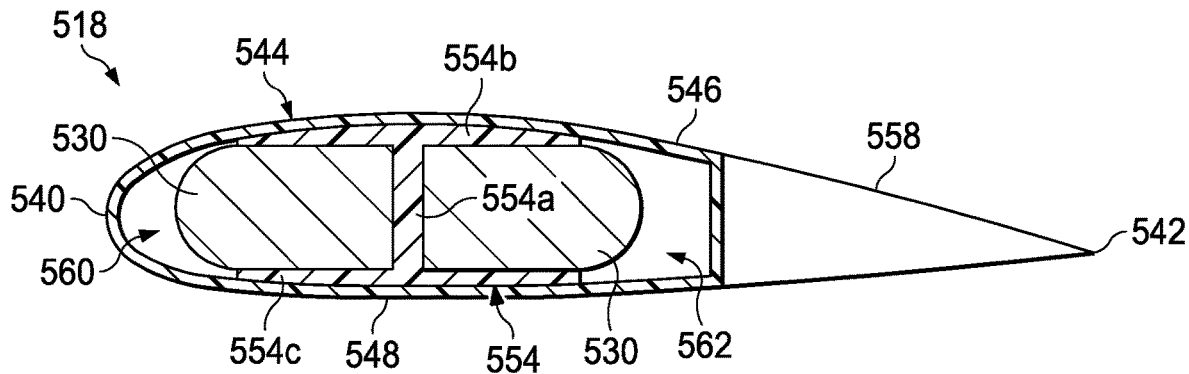
FIG. 9 is a cross-sectional view of an alternative wing for selectively housing one or more batteries.

As shown in FIG. 9, wing 518 extends in a chordwise direction between a leading edge 540 and a trailing edge 542, and is formed from a load-bearing skin 544 extending from leading edge 540 toward trailing edge 542 and having an upper skin portion 546 and a lower skin portion 548, a main spar 554 positioned between leading and trailing edges 540, 542, and a non-load-bearing flap 558 extending from an aft edge of load-bearing skin 544 to trailing edge 542. As shown, main spar 554 includes a generally vertical spar web 554a and upper and lower T-shaped spar caps 554b, 554c extending therefrom toward both leading and trailing edges 540, 542 such that main spar 554 has a generally I-shaped cross section.

Similarly to wings 18, wing 518 of the present version does not include a plurality of wing ribs spaced apart along the length of wing 518, such that a longitudinally-extending forward channel 560 is defined between leading edge 540 and main spar 554, and a longitudinally-extending aft channel 562 is defined between the aft edge of load-bearing skin 544 and main spar 554. Each channel 560, 562 may extend from a root (not shown) of wing 518 to an opening in an open wing tip (not shown) of wing 518. Since there are no wing ribs protruding across channels 560, 562 in the chordwise direction, channels 560, 562 may each define a substantially unobstructed longitudinal translation path, along which respective batteries 530 may be translated for inserting and removing batteries 530 into and out of wing 518. As shown, batteries 530 may be sized and shaped relative to main spar 554 to provide a sliding clearance fit therebetween, such as by having a size and shape substantially similar to that of the corresponding channel 560, 562 (e.g., by tracking the relatively straight/flat spar web 554a and the relatively straight/flat spar caps 554b, 554c of main spar 554).

Figure 10:
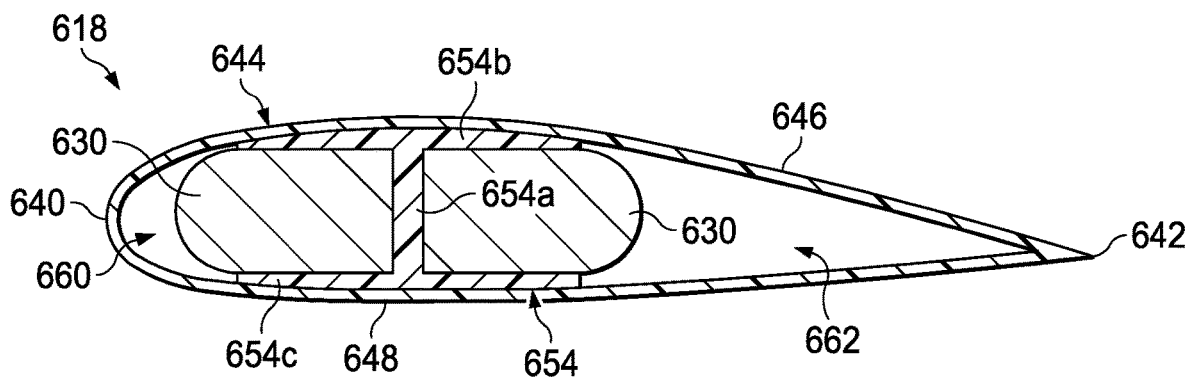
FIG. 10 is a cross-sectional view of another alternative wing for selectively housing one or more batteries.

As shown in FIG. 10, wing 618 extends in a chordwise direction between a leading edge 640 and a trailing edge 642, and is formed from a load-bearing skin 644 extending from leading edge 640 to trailing edge 642 and having an upper skin portion 646 and a lower skin portion 648, and a main spar 654 positioned between leading and trailing edges 640, 642. As shown, main spar 654 includes a generally vertical spar web 654a and upper and lower T-shaped spar caps 654b, 654c extending therefrom toward both leading and trailing edges 640, 642, such that main spar 654 has a generally I-shaped cross section.

Similarly to wings 18, wing 618 of the present version does not include a plurality of wing ribs spaced apart along the length of wing 618, such that a longitudinally-extending forward channel 660 is defined between leading edge 640 and main spar 654, and a longitudinally-extending aft channel 662 is defined between trailing edge 642 and main spar 654. Each channel 660, 662 may extend from a root (not shown) of wing 618 to an opening in an open wing tip (not shown) of wing 618. Since there are no wing ribs protruding across channels 660, 662 in the chordwise direction, channels 660, 662 may each define a substantially unobstructed longitudinal translation path, along which respective batteries 630 may be translated for inserting and removing batteries 630 into and out of wing 618. As shown, batteries 630 may be sized and shaped relative to main spar 654 to provide a sliding clearance fit therebetween, such as by having a size and shape substantially similar to that of the corresponding channel 660, 662 (e.g., by tracking the relatively straight/flat spar web 654a and the relatively straight/flat spar caps 654b, 654c of main spar 654). In some cases, the configuration of wing 618 may allow for simpler construction and/or a greater moment of inertia than that of wing 518, for example.

Figure 11:
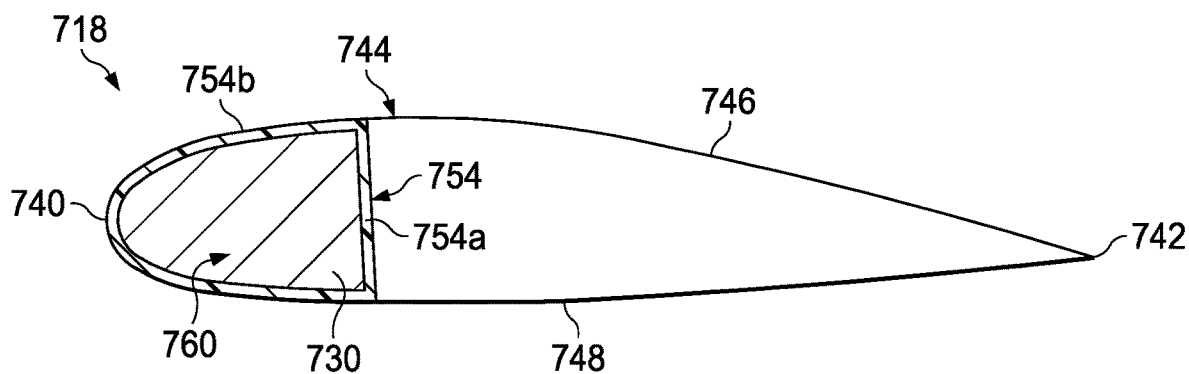
FIG. 11 is a cross-sectional view of another alternative wing for selectively housing one or more batteries.

As shown in FIG. 11, wing 718 extends in a chordwise direction between a leading edge 740 and a trailing edge 742, and is formed from a skin 744 extending from leading edge 740 to trailing edge 742 and having an upper skin portion 746 and a lower skin portion 748, and a hollow main spar 754 positioned between leading and trailing edges 740, 742. As shown, main spar 754 includes a generally vertical spar web 754a and a generally C-shaped structure 754b extending from upper and lower ends thereof toward leading edge 740, such that main spar 754 has a generally D-shaped cross section.

Similarly to wings 18, wing 718 of the present version does not include a plurality of wing ribs spaced apart along the length of wing 718, such that a longitudinally-extending channel 760 is defined within main spar 754. Channel 760 may extend from a root (not shown) of wing 718 to an opening in an open wing tip (not shown) of wing 718. Since there are no wing ribs protruding across channel 760 in the chordwise direction, channel 760 may define a substantially unobstructed longitudinal translation path, along which a battery 730 may be translated for inserting and removing battery 730 into and out of wing 718. As shown, battery 730 may be sized and shaped relative to main spar 754 to provide a sliding clearance fit therebetween, such as by having a size and shape substantially similar to that of channel 760 (e.g., by tracking the relatively straight/flat spar web 754a and the relatively contoured structure 754b of main spar 754). In some cases, the configuration of wing 718 may be closer to that of conventional aircraft wings than wings 518, 618, such that conventional aircraft wings may be retroactively reconfigured by removing wing ribs to define channel 760 and then retrofitted with battery 730, for example.

Figure 12:
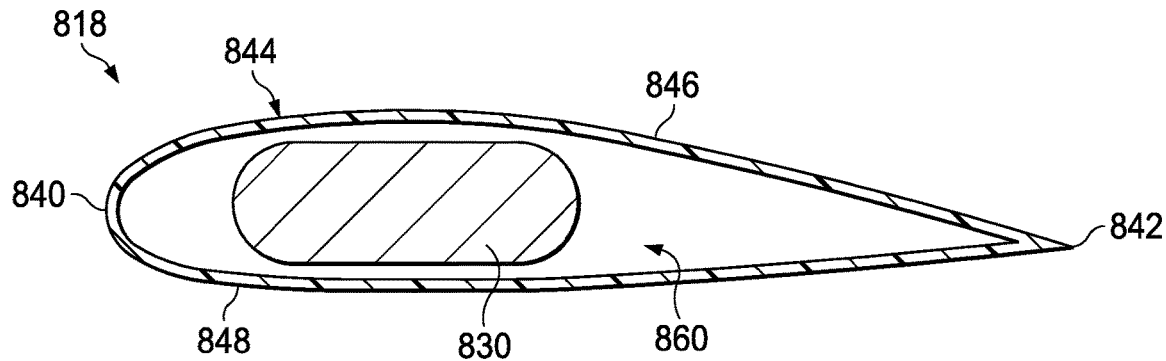
FIG. 12 is a cross-sectional view of another alternative wing for selectively housing one or more batteries.

As shown in FIG. 12, wing 818 extends in a chordwise direction between a leading edge 840 and a trailing edge 842, and is formed from a load-bearing skin 844 extending from leading edge 840 to trailing edge 842 and having an upper skin portion 846 and a lower skin portion 848.

Similarly to wings 18, wing 818 of the present version does not include a plurality of wing ribs spaced apart along the length of wing 818, such that a longitudinally-extending channel 860 is defined between leading edge 840 and trailing edge 842. Channel 860 may extend from a root (not shown) of wing 818 to an opening in an open wing tip (not shown) of wing 818. Since there are no wing ribs protruding across channel 860 in the chordwise direction, channel 860 may define a substantially unobstructed longitudinal translation path, along which a battery 830 may be translated for inserting and removing battery 830 into and out of wing 818. As shown, wing 818 has a sparless configuration, and various functionalities of the spar(s) which are omitted from wing 818 may be provided by the battery 830 itself. More particularly, battery 830 may provide the structural support to wing 818 which the spar(s) would otherwise provide. For example, when positioned within channel 860, battery 830 may mechanically engage each of the skin portions 846, 848, thereby reinforcing the structure of wing 818 and improving its stability to assist in preventing buckling of wing 818. In addition or alternatively, battery 830 may assist in transferring shear forces between the various components of wing 818. Battery 830 may be sized and shaped relative to skin portions 846, 848 to provide a sliding clearance fit therebetween, such as by having a size and shape substantially similar to that of channel 860 (e.g., by tracking the relatively contoured skin portions 846, 848). In some cases, the configuration of wing 818 may allow for a reduced weight compared to that of wings 518, 618, 718 by omitting the spar(s) and utilizing battery 830 itself to carry flight loads and the load of wing 818, for example.

Figure 13:
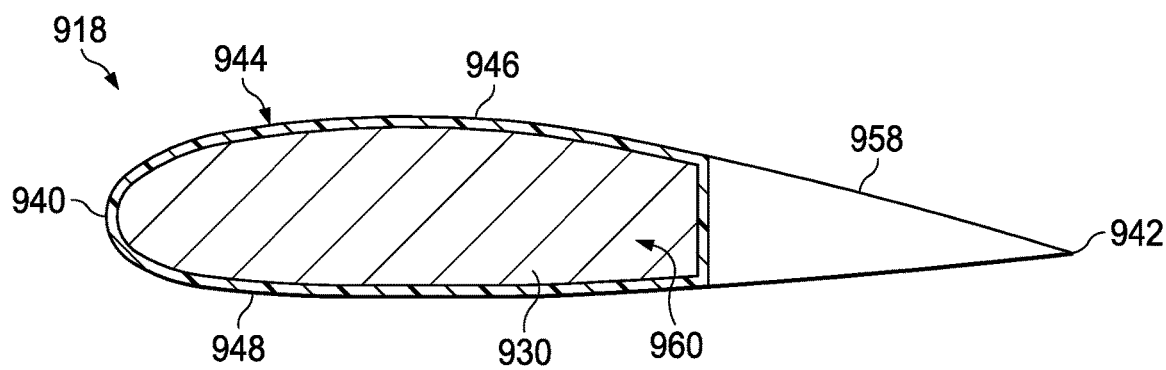
FIG. 13 is a cross-sectional view of another alternative wing for selectively housing one or more batteries.

As shown in FIG. 13, wing 918 extends in a chordwise direction between a leading edge 940 and a trailing edge 942, and is formed from a load-bearing skin 944 extending from leading edge 940 toward trailing edge 942 and having an upper skin portion 946 and a lower skin portion 948, and a non-load-bearing flap 958 extending from an aft edge of load-bearing skin 944 to trailing edge 942.

Similarly to wings 18, wing 918 of the present version does not include a plurality of wing ribs spaced apart along the length of wing 918, such that a longitudinally-extending channel 960 is defined between leading edge 940 and the aft edge of load-bearing skin 944. Channel 960 may extend from a root (not shown) of wing 918 to an opening in an open wing tip (not shown) of wing 918. Since there are no wing ribs protruding across channel 960 in the chordwise direction, channel 960 may define a substantially unobstructed longitudinal translation path, along which a battery 930 may be translated for inserting and removing battery 930 into and out of wing 918. As shown, wing 918 has a sparless configuration, and various functionalities of the spar(s) which are omitted from wing 918 may be provided by the battery 930 itself. More particularly, battery 930 may provide the structural support to wing 918 which the spar(s) would otherwise provide. For example, when positioned within channel 960, battery 930 may mechanically engage each of the skin portions 946, 948, thereby reinforcing the structure of wing 918 and improving its stability to assist in preventing buckling of wing 918. In addition or alternatively, battery 930 may assist in transferring shear forces between the various components of wing 918. Battery 930 may be sized and shaped relative to skin portions 946, 948 to provide a sliding clearance fit therebetween, such as by having a size and shape substantially similar to that of channel 960 (e.g., by tracking the relatively contoured skin portions 946, 948). In some cases, the configuration of wing 918 may allow for a reduced weight compared to that of wings 518, 618, 718 by omitting the spar(s) and utilizing battery 930 itself to carry flight loads and the load of wing 918, for example, and/or may allow battery 930 to have a greater volume than that of battery 830 by allowing battery 930 to substantially entirely occupy channel 960.

Figure 14:
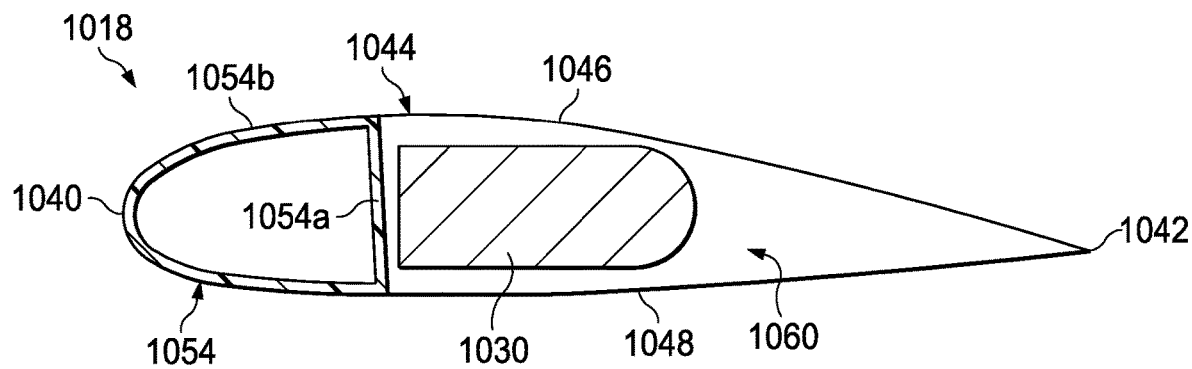
FIG. 14 is a cross-sectional view of another alternative wing for selectively housing one or more batteries.

As shown in FIG. 14, wing 1018 extends in a chordwise direction between a leading edge 1040 and a trailing edge 1042, and is formed from a skin 1044 extending from leading edge 1040 to trailing edge 1042 and having an upper skin portion 1046 and a lower skin portion 1048, and a hollow main spar 1054 positioned between leading and trailing edges 1040, 1042. As shown, main spar 1054 includes a generally vertical spar web 1054a and a generally C-shaped structure 1054b extending from upper and lower ends thereof toward leading edge 1040, such that main spar 1054 has a generally D-shaped cross section.

Similarly to wings 18, wing 1018 of the present version does not include a plurality of wing ribs spaced apart along the length of wing 1018, such that a longitudinally-extending channel 1060 is defined between main spar 1054 and trailing edge 1042. Channel 1060 may extend from a root (not shown) of wing 1018 to an opening in an open wing tip (not shown) of wing 1018. Since there are no wing ribs protruding across channel 1060 in the chordwise direction, channel 1060 may define a substantially unobstructed longitudinal translation path, along which a battery 1030 may be translated for inserting and removing battery 1030 into and out of wing 1018. As shown, battery 1030 may be sized and shaped relative to main spar 1054 and/or skin portions 1046, 1048 to provide a sliding clearance fit therebetween, such as by having a size and shape substantially similar to that of channel 1060 (e.g., by tracking the relatively straight/flat spar web 1054a and the relatively contoured skin portions 1046, 1048). In some cases, the configuration of wing 1018 may be generally similar to that of wing 718 while allowing battery 1030 to have a greater volume than that of battery 730 by positioning battery 1030 external to spar 1054. It will be appreciated that one or more additional batteries (not shown) may be positioned within spar 1054 in a manner similar to that described above with respect to wing 718.

Figure 15:
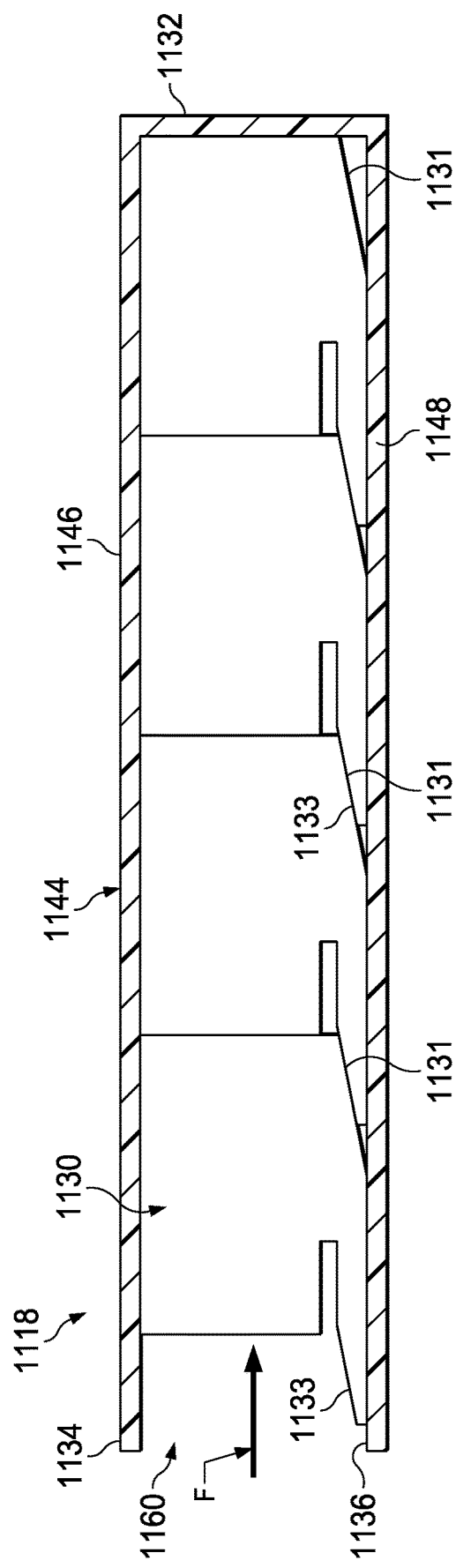
FIG. 15 is a cross-sectional view of another alternative wing for selectively housing one or more batteries.

As shown in FIG. 15, wing 1118 extends longitudinally between a wing root 1132 and an open wing tip 1134 having an opening 1136, and is formed from a skin 1144 having an upper skin portion 1146 and a lower skin portion 1148. Similarly to wings 18, wing 1118 of the present version does not include a plurality of wing ribs spaced apart along the length of wing 1118, such that a longitudinally-extending channel 1160 extends from root 1132 of wing 1118 to opening 1136 in open wing tip 1134. Channel 1160 may be defined between leading and trailing edges (not shown) of wing 1118. Since there are no wing ribs protruding across channel 1160 in the chordwise direction, channel 1160 may define a substantially unobstructed longitudinal translation path, along which one or more batteries 1130 may be translated for inserting and removing batteries 1130 into and out of wing 1118.

As shown, each battery 1130 may include a lower inboard chamfer 1131 and a lower outboard wedge 1133. In some versions, chamfer 1131 and wedge 1133 may be oriented at a same or similar angle relative to a bottom surface of the respective battery 1130. In any event, wedge 1133 of the relatively inboard battery 1130 of each longitudinally-adjacent pair of batteries 1130 may be configured to cammingly engage chamfer 1131 of the relatively outboard battery 1130 of the longitudinally-adjacent pair of batteries 1130 in response to application of an inboard-directed force F being applied to the relatively outboard battery 1130, to thereby urge the interfacing portions of the longitudinally-adjacent pair of batteries 1130 away from each other in the vertical direction. More particularly, such camming engagement may cause an inboard portion of the relatively outboard battery 1130 to move slightly upwardly to increase frictional engagement between the relatively outboard battery 1130 and upper skin portion 1146, and/or may cause an outboard portion of the relatively inboard battery 1130 to move slightly downwardly to increase frictional engagement between the relatively inboard battery 1130 and lower skin portion 1148. In this manner, batteries 1130 may assist with urging each other into firm contact with both the top and bottom of channel 1160 during flight operations, such that each battery 1130 may reliably and effectively resist buckling loads. While each chamfer 1131 and wedge 1133 of the present version is positioned on a lower portion of the respective battery 1130, it will be appreciated that chamfers 1131 and wedges 1133 may alternatively be positioned on upper portions of the respective batteries 1130. Moreover, while each chamfer 1131 of the present version is positioned on an inboard portion of the respective battery 1130 and each wedge 1133 of the present version is positioned on an outboard portion of the respective battery 1130, it will be appreciated that chamfers 1131 and wedges 1133 may alternatively be positioned on outboard and inboard portions of batteries 1130, respectively.

While various wing configurations have been described herein, it will be appreciated that any other suitable type of wing configuration may be used to provide one or more substantially unobstructed longitudinal translation paths along which one or more power sources may be translated for inserting and removing such power sources into an out of the wing.

Figure 16:
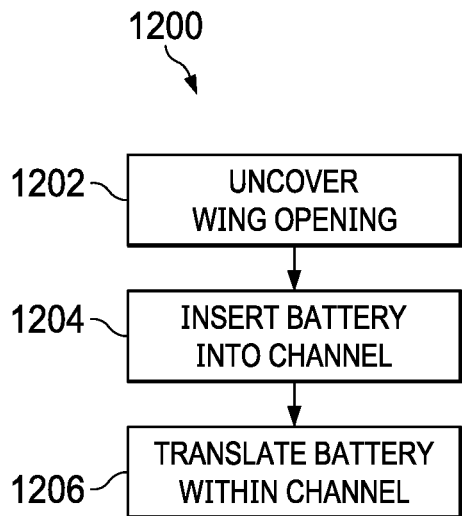
FIG. 16 is a flowchart of an exemplary method of storing an electrical power source on an aircraft.

Referring now to FIG. 16, a method 1200 of storing an electrical power source, such as any of batteries 30, 130, 230, 330, 430, 530, 630, 730, 830, 930, 1030, on an aircraft, such as any of aircraft 10, 110, 210, 310, 410, begins with step 1202, at which a wing opening, such as any of openings 36, 136, 336, 436, 1136 is selectively uncovered. Method 1200 proceeds to step 1204, at which the battery 30, 130, 230, 330, 430, 530, 630, 730, 830, 930, 1030, 1130 is inserted into a longitudinally-extending wing channel, such as any of channels 60, 62, 560, 562, 660, 662, 760, 860, 960, 1060, 1160, which may include being inserted through the wing opening 36, 136, 336, 436, 1136. In some versions, method 1200 may omit step 1202 and begin with step 1204. In any event, method 1200 proceeds to step 1206, at which the battery 30, 130, 230, 330, 430, 530, 630, 730, 830, 930, 1030, 1130 is translated longitudinally within the channel 60, 62, 560, 562, 660, 662, 760, 860, 960, 1060, 1160, which may include being translated toward a fuselage 12, 112, 212, 312, 412 of the aircraft 10, 110, 210, 310, 410. In some versions, such longitudinal translation may include applying an inboard-directed force to an outboard battery 1130 to cammingly engage corresponding chamfers 1131 and wedges 1133 of the batteries 1130 within the channel 1160.

Figure 17:
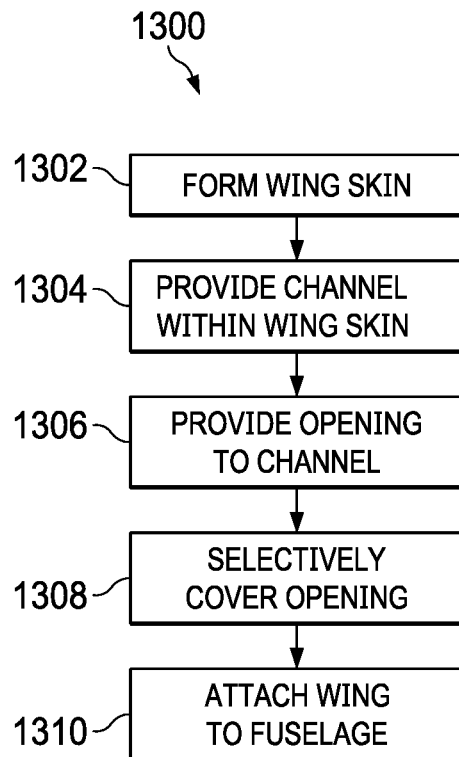
FIG. 17 is a flowchart of an exemplary method of manufacturing an aircraft.

Referring now to FIG. 17, a method 1300 of manufacturing an aircraft, such as any of aircraft 10, 110, 210, 310, 410, begins with step 1302, at which a wing skin, such as any of skins 44, 344, 444, 544, 644, 744, 844, 944, 1044, 1144, is formed. Method 1300 proceeds to step 1304, at which a longitudinally-extending channel, such as any of channels 60, 62, 560, 562, 660, 662, 760, 860, 960, 1060, 1160, is provided within the skin 44, 344, 444, 544, 644, 744, 844, 944, 1044, 1144, to define a longitudinal translation path along which respective batteries 30, 130, 230, 330, 430, 530, 630, 730, 830, 930, 1030, 1130 may be translated. In the illustrated version, method 1300 further includes step 1306, at which a wing opening, such as any of openings 36, 136, 336, 436, 1136, is provided to facilitate access to the channel(s) 60, 62, 560, 562, 660, 662, 760, 860, 960, 1060, 1160, as well as step 1308, at which the wing opening 36, 136, 336, 436, 1136 is selectively covered, such as via any of rotatable nacelles 20, 120 and/or access panels 351, 451. In the example shown, method 1300 further includes step 1310, at which the wing skin 44, 344, 444, 544, 644, 744, 844, 944, 1044, 1144 (e.g., together with any other wing components) is attached to a fuselage, such as any of fuselages 12, 112, 212, 312, 412.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wing for an aircraft, the wing comprising:
   (a) a first end comprising an open wing tip comprising an opening;
   (b) a second end;
   (c) a skin extending longitudinally from the first end to the second end; and
   (d) at least one channel positioned within the skin and extending longitudinally between the first and second ends, wherein the at least one channel defines a longitudinal translation path for translating at least one electrical power source longitudinally between the first and second ends; and
   (e) a nacelle rotatable between horizontal and vertical orientations to selectively cover and uncover the opening.

2. The wing of claim 1, wherein the wing is ribless.

3. The wing of claim 1, further comprising the at least one electrical power source inserted longitudinally between the first and second ends, the at least one electrical power source configured to provide structural support to the wing.

4. The wing of claim 1, further comprising a a spar within the skin and defining a space between the spar and the skin, and further comprising a conversion motor disposed within the space, the conversion motor configured to selectively rotate the nacelle.

5. The wing of claim 1, further comprising a main spar within the skin and comprising an I-shape, the main spar configured to at least partially define two channels comprising the at least one channel, each of the two channels configured to receive the at least one electrical power source therein.

6. The wing of claim 1, further comprising an access panel movable between closed and open states for selectively covering and uncovering the opening, respectively.

7. The wing of claim 1, wherein the second end includes one of a root or a carry-through region, wherein the at least one channel extends longitudinally from the outboard wing tip to the one of a root or a carry-through region.

8. The wing of claim 1, wherein the first and second ends define a wing length, wherein the at least one channel has a channel length substantially equal to the wing length.

9. The wing of claim 1, wherein the at least one channel includes a forward channel and an aft channel.

10. The wing of claim 1, further comprising at least one spar positioned within the skin and extending longitudinally between the first and second ends.

11. The wing of claim 10, wherein the at least one spar at least partially defines the at least one channel.

12. The wing of claim 11, wherein the at least one spar includes at least one vertical spar web, wherein the at least one channel is defined by the at least one vertical spar web and one of a leading edge or a trailing edge of the wing.

13. The wing of claim 1, further comprising at least one battery positioned within the at least one channel and configured to translate longitudinally between the first and second ends along the longitudinal translation path.

14. The wing of claim 13, wherein the at least one battery includes a wedge.

15. The wing of claim 1, wherein the at least one channel is free of protrusions extending thereacross.

16. An aircraft comprising:
(a) a fuselage; and
(b) a wing operatively coupled to the fuselage and extending longitudinally between first and second ends, the first and second ends located on opposite sides of the fuselage, wherein the wing includes at least one channel extending longitudinally between the first and second ends, wherein the at least one channel defines a longitudinal translation path for translating at least one electrical power source longitudinally between the first and second ends, the at least one channel comprising a carry-through region located at least partially above the fuselage.

17. The aircraft of claim 16, further comprising at least one battery positioned within the at least one channel and configured to translate longitudinally between the first and second ends along the longitudinal translation path.

18. A method of storing an electrical power source on an aircraft, the method comprising:
(a) inserting the electrical power source into a longitudinally-extending channel provided in a ribless wing of the aircraft; and
(b) translating the electrical power source longitudinally within the channel to provide structural support to the ribless wing.

19. The method of claim 18, wherein translating the electrical power source longitudinally within the channel includes translating the electrical power source toward a fuselage of the aircraft.

20. The method of claim 18, further comprising selectively uncovering an opening provided in the wing, wherein inserting the electrical power source into the channel includes inserting the electrical power source through the opening.

* * * * *